(12) United States Patent
Okamoto et al.

(10) Patent No.: US 11,920,781 B2
(45) Date of Patent: Mar. 5, 2024

(54) LIGHTING DEVICE AND DISPLAY

(71) Applicant: NICHIA CORPORATION, Anan (JP)

(72) Inventors: Yoshio Okamoto, Yokohama (JP); Hiroshi Miyairi, Yokohama (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/944,186

(22) Filed: Sep. 14, 2022

(65) Prior Publication Data
US 2023/0100720 A1 Mar. 30, 2023

(30) Foreign Application Priority Data
Sep. 30, 2021 (JP) ................. 2021-162183

(51) Int. Cl.
| | |
|---|---|
| F21V 7/00 | (2006.01) |
| F21V 5/00 | (2018.01) |
| F21V 7/05 | (2006.01) |
| F21V 13/04 | (2006.01) |
| G02B 30/00 | (2020.01) |

(52) U.S. Cl.
CPC ............ F21V 7/0025 (2013.01); F21V 5/008 (2013.01); F21V 7/05 (2013.01); F21V 13/04 (2013.01); *G02B 30/00* (2020.01)

(58) Field of Classification Search
CPC .......... F21V 7/05; F21V 7/0025; F21V 5/008; F21V 13/04; G02B 30/00
See application file for complete search history.

(56) References Cited

U.S. PATENT DOCUMENTS

| | | | |
|---|---|---|---|
| 6,646,813 B2* | 11/2003 | Falicoff ................ | G02B 27/145 359/641 |
| 2002/0008969 A1* | 1/2002 | Mabuchi .............. | G02B 6/0038 362/610 |
| 2009/0219595 A1 | 9/2009 | Olaya et al. | |
| 2010/0220261 A1* | 9/2010 | Mizushima ....... | G02F 1/133615 362/606 |
| 2012/0127715 A1 | 5/2012 | Ariga et al. | |
| 2016/0230962 A1* | 8/2016 | Yan ..................... | G09F 13/0409 |
| 2016/0378062 A1 | 12/2016 | Watanabe et al. | |
| 2020/0233134 A1* | 7/2020 | Redmond ............ | G03H 1/0465 |

FOREIGN PATENT DOCUMENTS

| | | |
|---|---|---|
| JP | 2000-510275 | 8/2000 |
| JP | 2001-042258 | 2/2001 |
| JP | 2008-122949 | 5/2008 |
| JP | 2009-020251 | 1/2009 |
| JP | 2009-258664 | 11/2009 |
| JP | 2011-238698 | 11/2011 |
| JP | 2014-215332 | 11/2014 |
| JP | 2015-184288 | 10/2015 |
| WO | WO 97/044697 | 11/1997 |

* cited by examiner

*Primary Examiner* — Evan P Dzierzynski
*Assistant Examiner* — Nathaniel J Lee
(74) *Attorney, Agent, or Firm* — MORI & WARD, LLP

(57) ABSTRACT

A lighting device that includes a light source, a first optical element configured to convert light emitted from the light source into substantially parallel light, and a plurality of second optical elements arranged in a first direction. Each of the plurality of second optical elements has a light incident surface. Each of the plurality of second optical elements guides at least a portion of the substantially parallel light incident on the light incident surface in a second direction intersecting the first direction and guides another portion in the first direction.

20 Claims, 18 Drawing Sheets

FIG.20

| EXAMPLE | LED/LENS CONFIGURATION | | MIRROR | | UTILIZATION EFFICIENCY OF LIGHT | DIFFERENCE IN AMOUNT OF LIGHT IN IRRADIATION SURFACE | COST | INTERFERENCE BETWEEN PENCILS OF RAYS | |
|---|---|---|---|---|---|---|---|---|---|
| | 2 SETS | 1 SET | BS | GLASS BLANK | | | | WEAK DIVERGENCE | REFLECTION ON FRONT AND BACK |
| 1 | ✓ | | ✓ | | ◎ | ○ | △ | ○ | ○ |
| 2 | ✓ | | ✓ | | ○ | ○ | △ | ○ | ○ |
| 3 | ✓ | | ✓ | | △ | ○ | ○ | ○ | ○ |
| 4 | | ✓ | ✓ | | ○ | ○ | △~○ | △ | △ |
| 5 | | ✓ | | ✓ | ◎ | △ | ◎ | △ | △ |
| 6 | | ✓ | | ✓ (AR-COATED) | △ | △ | ○~◎ | △ | △ |
| 7 | | ✓ | | ✓ (PARTIALLY AR-COATED) | ○ | △ | ○~◎ | △ | △ |
| 8 | ✓ | | | ✓ | △ | △ | ◎ | ○ | ○~△ |

LIGHTING DEVICE AND DISPLAY

CROSS-REFERENCE TO RELATED APPLICATION

This application claims priority to Japanese Patent Application No. 2021-162183 filed on Sep. 30, 2021, the disclosure of which is hereby incorporated by reference in its entirety.

BACKGROUND

The present disclosure relates to a lighting device and a display.

Examples of a technique to display a stereo image include display technologies such as holography and an arc 3D type technique. In both techniques, a stereo image can be displayed in a space by applying illuminating light for reproduction to a glass plate or a film surface subjected to a special process. The light is applied to a line drawing engraved in the surface of the glass plate or the film surface, and the light is reflected, refracted, or scattered at the edges of the line drawing to reach the eye, so that a stereo image floating in the air is visually recognized.

A configuration has been known in which scintillation is reduced by splitting light emitted from a super-high pressure mercury lamp with a semitransparent mirror array and synthesizing a plurality of beams having a difference in optical path length equal to or longer than the coherence length (for example, see Japanese Patent Publication No. 2008-122949).

SUMMARY

It is desirable that a lighting device can uniformly illuminate an entire irradiation surface of a display film or the like. In the case of a stereo display application, it is desirable that the lighting device be small and disposed near an irradiation surface. In order to illuminate the entire irradiation surface with a single light source, a distance from the light source to the irradiation surface is required, which reduces the illuminance and increases the space. On the other hand, use of a large number of light sources not only increases the cost but may also deteriorate the quality of a display image due to interference of beams of the light sources. The present disclosure advantageously provides a lighting device that can illuminate the entire irradiation surface with a small number of light sources in the vicinity of the irradiation surface.

In an embodiment, a lighting device includes a light source, a first optical element configured to convert light emitted from the light source into substantially parallel light, and a plurality of second optical elements arranged in a first direction. Each of the plurality of second optical elements has a light incident surface. Each of the plurality of second optical elements guides at least a portion of the substantially parallel light incident on the light incident surface in a second direction intersecting the first direction and guides another portion in the first direction.

A lighting device that can illuminate the entire irradiation surface with a small number of light sources in the vicinity of the irradiation surface is obtained.

DESCRIPTION OF DRAWINGS

FIG. 20 summarizes specifications and performance of Examples 1 to 8.

DESCRIPTIONS

An embodiment provides a lighting device that is disposed close to an irradiation surface such as a display panel and a display film and can substantially uniformly illuminate an entire irradiation surface with a small number of light sources. In order to obtain such a device, a light source, a first optical element that converts light emitted from the light source into substantially parallel light, and a plurality of second optical elements arranged in a first direction are provided. Each of the second optical elements has a light incident surface and guides at least a portion of the substantially parallel light incident on the light incident surface in a second direction intersecting the first direction and guides another portion in the first direction.

Figure 1:
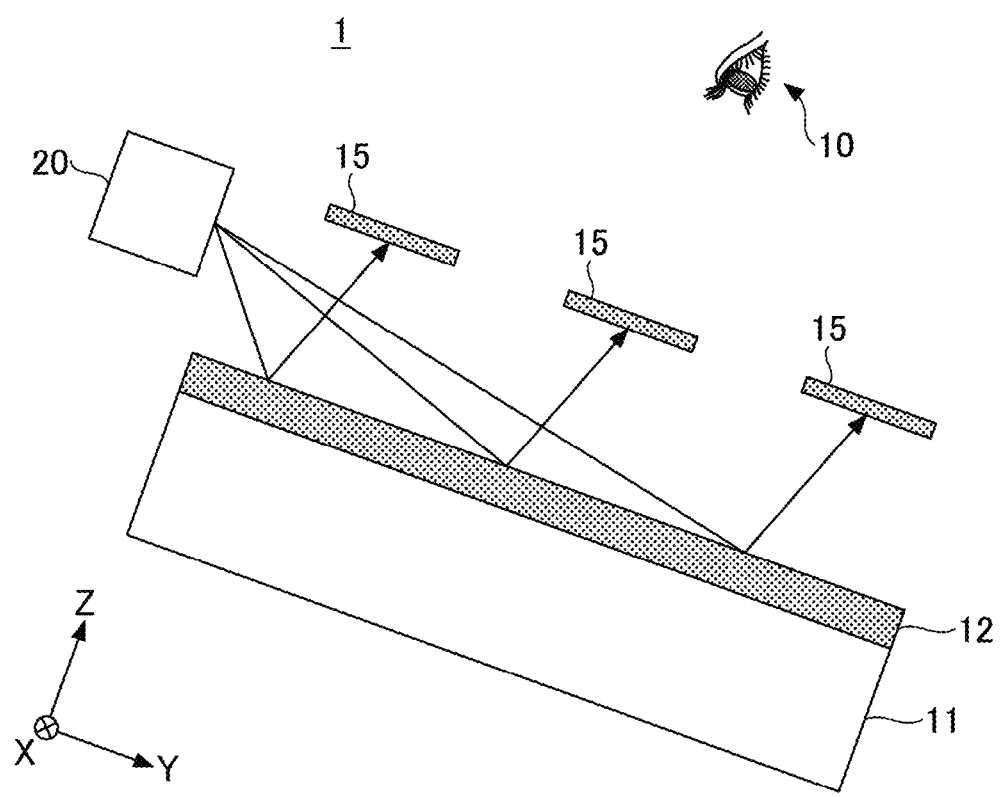
FIG. 1 schematically shows a display to which a lighting device of an embodiment is applied.

FIG. 1 schematically shows a display 1 to which a lighting device 20 of the embodiment is applied. For example, the display 1 includes a display panel 11, a stereo display sheet 12, and the lighting device 20 disposed along a side of the display panel 11 or the stereo display sheet 12. For example, the display panel 11 is an existing display panel that displays a one-dimensional or two-dimensional image. The stereo display sheet 12 is a sheet for stereo display such as a holographic sheet and an arc 3D sheet. The irradiation surface of the stereo display sheet 12 is referred to as an X-Y surface, and the height direction of the display panel 11 is referred to as a Z direction. The stereo display sheet 12 is irradiated with light emitted from the lighting device 20, so that a stereo image 15 of a line drawing engraved in the stereo display sheet 12 is displayed in a space between an eye 10 of an observer and the stereo display sheet 12.

In order to clearly display the stereo image 15 in the visual field of the eye 10, it is desirable that the entire irradiation surface of the stereo display sheet 12 can be irradiated with substantially parallel light in which interference between adjacent reflected pencils of rays is small. In view of miniaturization of the display 1, the lighting device 20 is desirably disposed near the display panel 11 or the stereo display sheet 12. In the embodiment, the first optical element converts light emitted from the light source into substantially parallel light, and the second optical elements arranged in the X direction guide at least a portion of the substantially parallel light incident on the second optical elements in a direction (such as a Y direction or a —Y direction) intersecting the X direction. The entire irradiation surface is thus illuminated from the vicinity of the stereo display sheet 12, which is the irradiation surface.

First Embodiment

Figure 2:
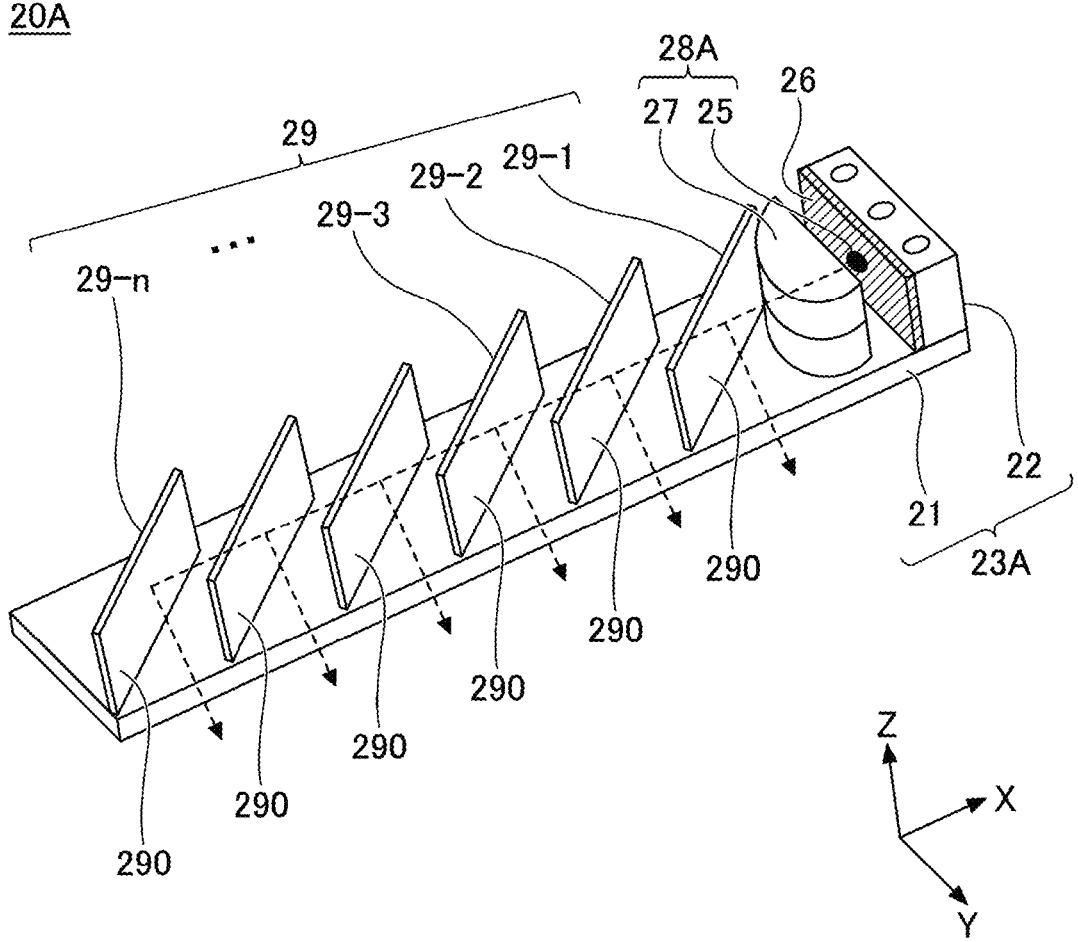
FIG. 2 schematically shows a lighting device of a first embodiment.

FIG. 2 schematically shows a lighting device 20A of a first embodiment. The lighting device 20A includes a light source 25, a first optical element 27, and a plurality of second optical elements 29-1 to 29-n (n is an integer of 2 or more). The direction of arrangement of the second optical elements 29-1 to 29-n (hereinafter may be collectively referred to as "second optical elements 29") is regarded as the X direction, the height direction of the lighting device 20A or the second optical elements 29 is regarded as the Z direction, and the direction orthogonal to the X direction and the Z direction is regarded as the Y direction.

The light source 25, the first optical element 27, and the second optical elements 29-1 to 29-n are held by a casing 23A. In FIG. 2, an upper cover of the casing 23A is omitted for convenience of illustration, but the casing 23A can be provided with the upper cover as described below. For example, the light source 25 is a minute optical device such as a light-emitting diode (LED), a laser diode (LD), and a super luminescent diode (SLD) mounted on a mounting substrate 26. A constant current circuit or wiring for driving the light source 25 can be formed on the mounting substrate 26.

In the case in which the light source 25 is a low-coherence optical device such as an LED and an SLD, the first optical element 27 is a collimating lens and converts light emitted from the light source 25 into substantially parallel light. The collimating lens can be any lens as long as the lens can convert diverging light emitted from the light source 25 into substantially parallel light. For example, the lens can be a spherical lens or a cylindrical lens formed of glass, an acrylic resin, or a polycarbonate.

In the case in which the light source 25 is an LD, the first optical element 27 can be a beam expander that increases the beam diameter to a size suitable for the light incident surface of the second optical element 29 or converts an elliptical beam into a circular beam.

In the first embodiment, an assembly 28A including the light source 25 and the first optical element 27 is disposed inside a lateral surface 22 of the casing 23A and disposed along the X direction as with the second optical elements 29-1 to 29-n. Hereinafter the +X direction and the –X direction are collectively referred to as the "X direction." The second optical elements 29-1 to 29-n are fixed to a lower surface 21 of the casing 23A at predetermined intervals. The second optical elements 29-1 to 29-n are inclined relative to an X axis at an angle of 40° to 50°, more preferably 42° to 48°, further preferably 44° to 46°.

Each of the second optical elements 29-1 to 29-n has a light incident surface 290. Light emitted from the light source 25 and converted into substantially parallel light by the first optical element 27 is incident on the light incident surface 290 of the second optical element 29-1 located closest to the light source 25. A portion of the light incident on the light incident surface 290 is reflected in the Y direction, and the other portion is transmitted in the X direction. The substantially parallel light transmitted through the second optical element 29-1 is incident on the light incident surface 290 of the next second optical element 29-2. A portion of the light is reflected in the Y direction, and the other portion is transmitted in the X direction. Thereafter, at least a portion of the incident light is successively projected in the Y direction by the second optical elements 29-3 to 29-n.

In view of reducing the optical loss, the light incident surface 290 of the second optical element 29-n farthest from the light source 25 can have such a reflectance as to reflect 50% or more, preferably 90% or more, more preferably 95% or more, of light incident on the light incident surface 290. The second optical elements 29-1 to 29-n are formed of beam splitters, mirrors, or glass plates having predetermined reflectances. Each of the second optical elements 29-1 to 29-n can have a dielectric mirror, a metal reflective film, or the like on the light incident surface of an optical plate made of glass, an acrylic resin, a polycarbonate, or the like or can have a diffraction grating designed to have a predetermined reflectance. The second optical elements 29-1 to 29-n can be cubic or prismatic beam splitters or mirrors instead of the plate-shaped optical elements shown in the drawings. Alternatively, a portion or the whole of the second optical elements 29-1 to 29-n can be glass blanks as described below or can be glass plates in which antireflection coatings are formed on the back surfaces of the light incident surfaces 290.

The lighting device 20A, which has the configuration in FIG. 2, can apply substantially parallel light to the irradiation surface without gaps using the single light source 25. Further, all of the light source 25, the first optical element 27, and the second optical elements 29-1 to 29-n are compactly arranged in the X direction, so that the lighting device 20A can be disposed along a side of the display panel 11 or the stereo display sheet 12 and disposed closely to the irradiation surface.

Figure 3:
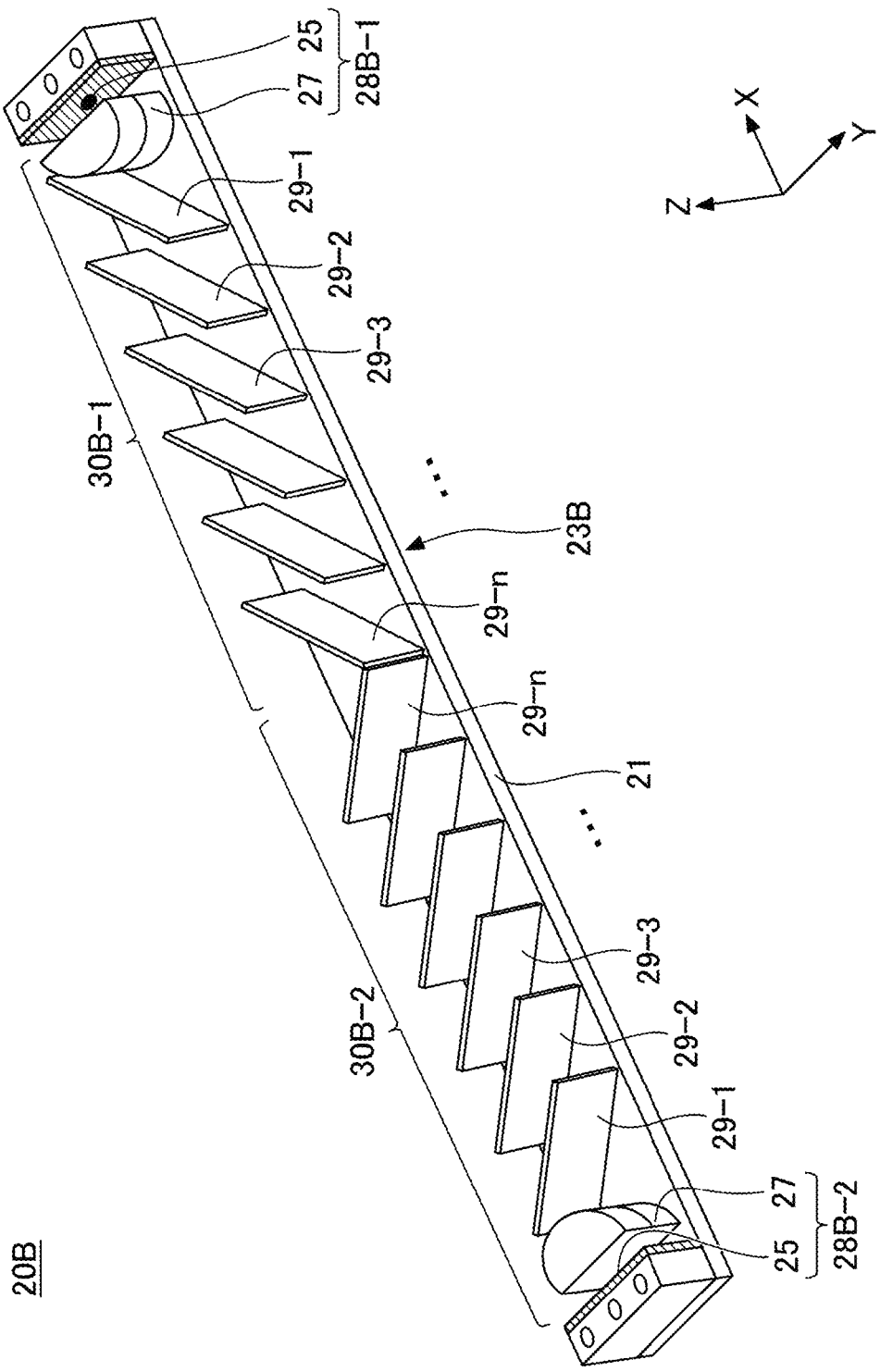
FIG. 3 schematically shows a modification of the lighting device of the first embodiment.

FIG. 3 schematically shows a modification of the lighting device of the first embodiment. A lighting device 20B includes a first unit 30B-1 and a second unit 30B-2 each including the light source 25, the first optical element 27, and the second optical elements 29-1 to 29-n. In this example, the first unit 30B-1 and the second unit 30B-2 are disposed along the X direction symmetrically about the center of the longitudinal direction (X direction) of the lower surface 21 of a casing 23B. The first unit 30B-1 and the second unit 30B-2 may be collectively referred to as the "units 30B" as appropriate.

In the first unit 30B-1 and the second unit 30B-2, assemblies 28B-1 and 28B-2 each of which includes the light source 25 and the first optical element 27 are disposed at both ends in the X direction. In each of the first unit 30B-1 and the second unit 30B-2, light emitted from the light source 25 and converted into substantially parallel light by the first optical element 27 is projected by the second optical elements 29 in the Y direction while the light is guided from the outside toward the center in the X direction.

The configuration in FIG. 3 is effective when a stereo display sheet 12 having a large area is illuminated. In each unit 30B of the lighting device 20B, all of the light source 25, the first optical element 27, and the second optical elements 29-1 to 29-n are compactly arranged in the X direction, and the lighting device 20B can be disposed along a side of the display panel 11 or the stereo display sheet 12 closely to the irradiation surface. The number of the light sources 25 disposed at both ends in the X direction is only two, the second optical elements 29-n located at the central portion reflect in the Y direction substantially the entire incident light guided from both sides, and the loss of light and interference between adjacent reflected pencils of rays are reduced. Further, the second optical elements 29-1 to 29-n reflect the light in the Y direction before the divergence of the substantially parallel light increases, so that interference between adjacent reflected pencils of rays is also reduced.

The wavelengths of the light sources 25 used in the first unit 30B-1 and the second unit 30B-2 can be the same or different. According to the line drawing engraved in the stereo display sheet 12, a color stereo image 15 can be displayed in the air by irradiating half the irradiation surface with white light and irradiating the other half with green light. As described above, in the lighting device 20B, color mixing hardly occurs even in the case in which light sources 25 having different wavelengths are used because interference between adjacent reflected pencils of rays is small, and the irradiation surface can be irradiated with two colors of light.

Figure 4A:
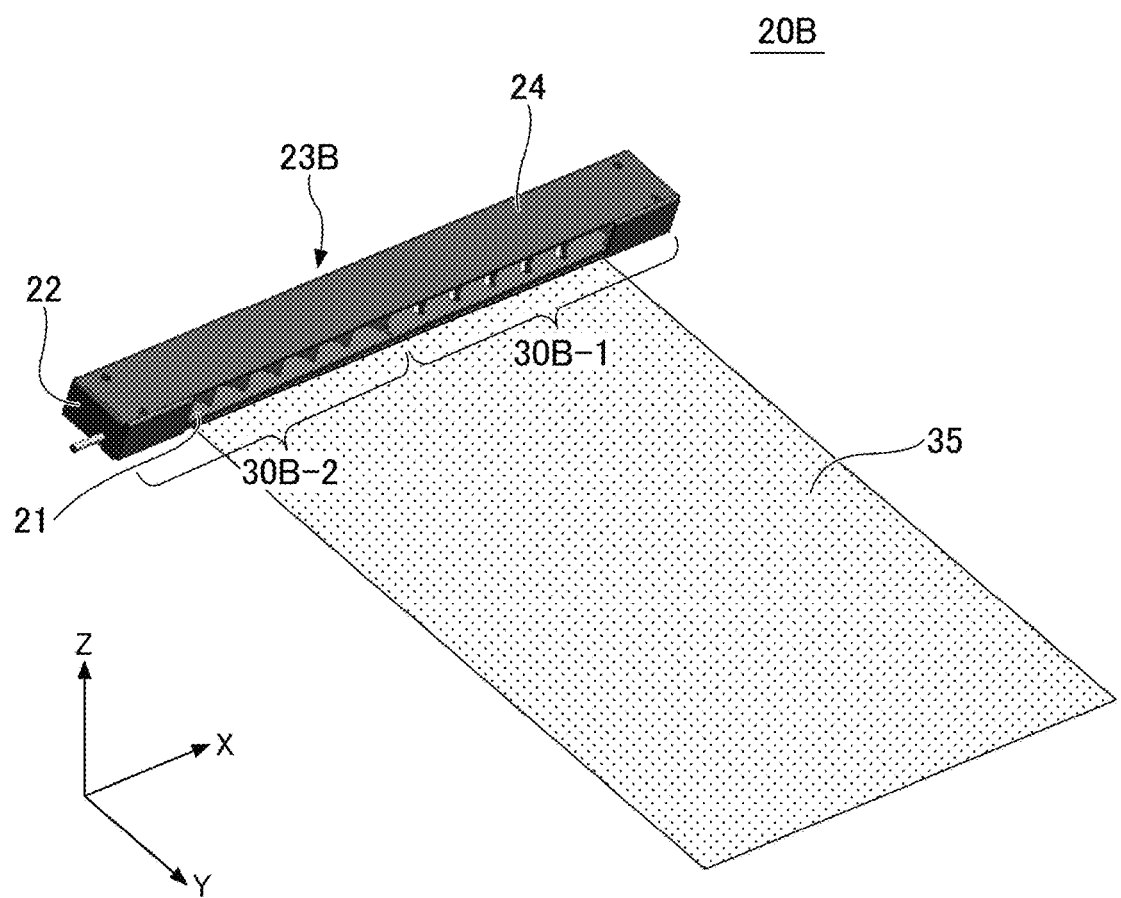
FIG. 4A schematically shows an irradiation state of the lighting device in FIG. 3.
Figure 4B:
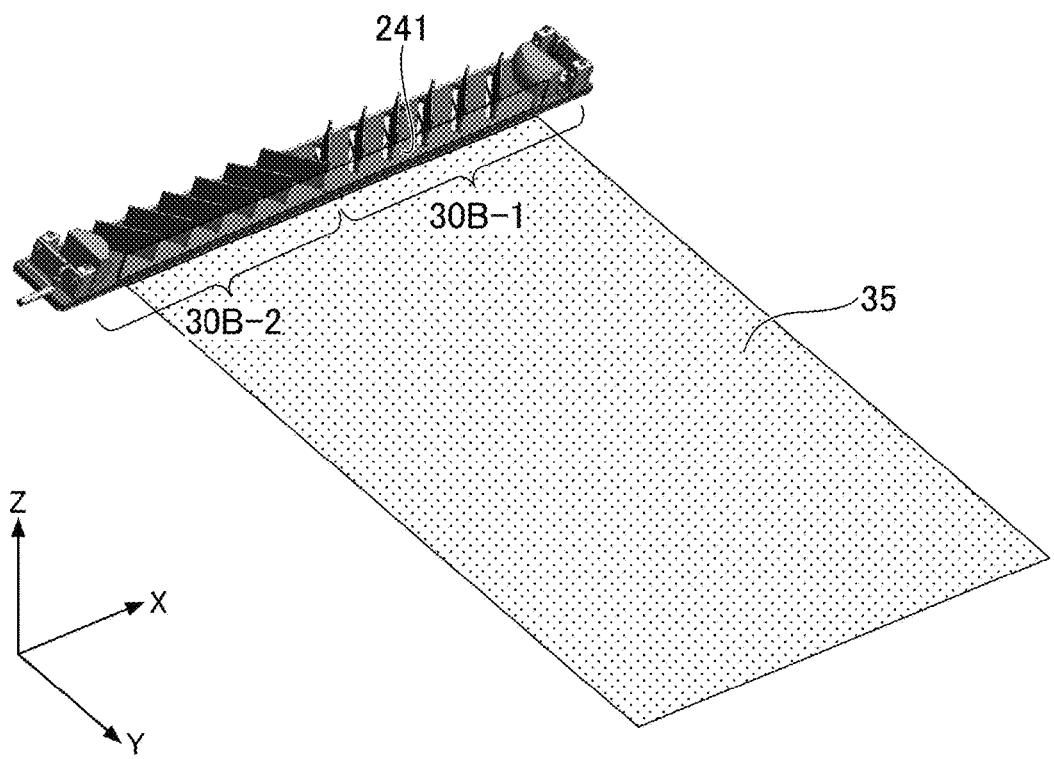
FIG. 4B schematically shows the irradiation state of the lighting device in FIG. 3.

FIG. 4A and FIG. 4B schematically show the irradiation state of the lighting device 20B in FIG. 3. In FIG. 4A, the entire lighting device 20B is housed inside the casing 23B. The casing 23B has the lower surface 21 and the lateral surface 22 as well as an upper surface 24 covering the entire second optical elements 29 (see FIG. 3). In each of the first unit 30B-1 and the second unit 30B-2, substantially parallel light is at least partially projected successively in the Y direction while the light is transmitted from the end toward the center in the X direction. A cover can be disposed on an open surface, that is, the surface from which light is extracted, of the casing 23B.

For example, a cover 241 can be disposed on the light exit side of the lighting device 20B as shown in FIG. 4B. In order to clearly indicate the arrangement of the cover 241, the upper surface 24 is not shown in FIG. 4B. The cover 241 can be subjected to an optical treatment to guide a light beam 35 projected in the Y direction by the second optical elements 29-1 to 29-n (see FIG. 3) obliquely downward toward a target irradiation surface such that the light beam 35 projected from the lighting device 20B in the Y direction is guided below the X-Y surface defined by the X direction and the Y direction. The stereo display cannot be obtained when the light beam 35 projected in the Y direction by the second optical elements 29-1 to 29-n is not applied to the surface of the stereo display sheet 12 but is projected in a direction parallel to the surface, which causes the image formed on the stereo display sheet 12 not to be illuminated. The cover 241 disposed on the light exit side can be used for the lighting device 20A in FIG. 2.

Figure 5:
FIG. 5 schematically shows the irradiation state of the lighting device in FIG. 3.
Figure 5:
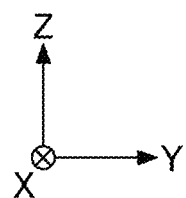

FIG. 5 schematically shows the irradiation state of the lighting device in FIG. 3. Specifically, FIG. 5 schematically shows light projected in the Y direction by the lighting device 20A or 20B (hereinafter may be collectively referred to as the "lighting device 20" as appropriate). The light projected from the lighting device 20 in the Y direction is projected at an inclination of 1 to some degrees, such as 1.5 to 2.5 degrees, relative to the X-Y surface, according to the size of the irradiation surface. With the substantially parallel light projected from the lighting device 20, the entire surface of the stereo display sheet 12 can be evenly irradiated from the vicinity of the surface of the stereo display sheet 12.

The second optical elements 29-1 to 29-n are arranged so as to minimize the overlap between rays of the substantially parallel light projected in the Y direction and to suppress formation of dark lines on the irradiation surface. For this arrangement, each of the second optical elements 29-1 to 29-n is offset in the direction (−Y direction when the direction of projection of light is the Y direction as described above) opposite to the projection side of the light as the distance from the light source 25 increases. Alternatively, the widths of the second optical elements 29-1 to 29-n in the Y direction increase as the distance from the light source 25 increases.

Figure 6A:
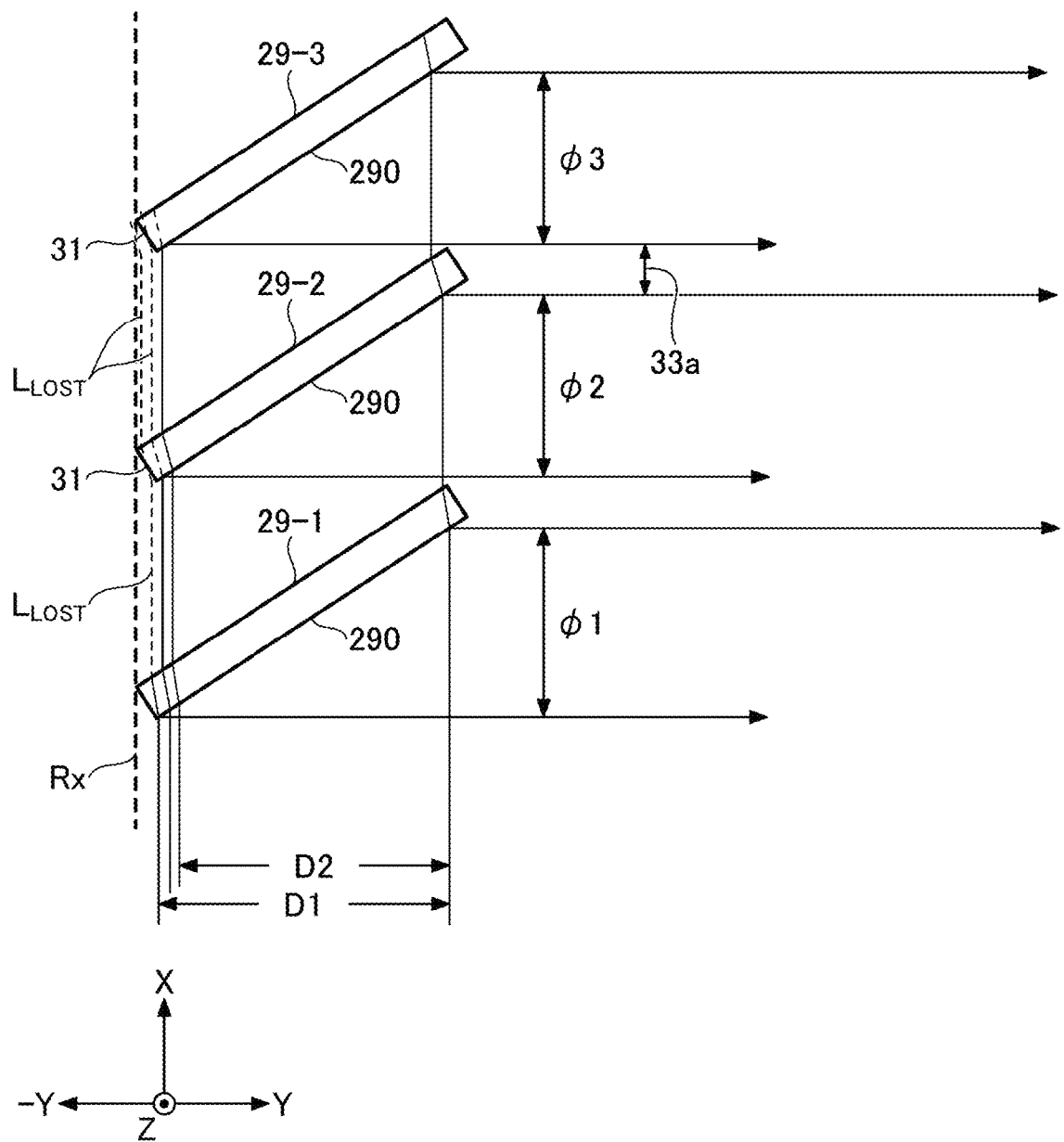
FIG. 6A schematically shows an example of the arrangement of second optical elements.
Figure 6B:
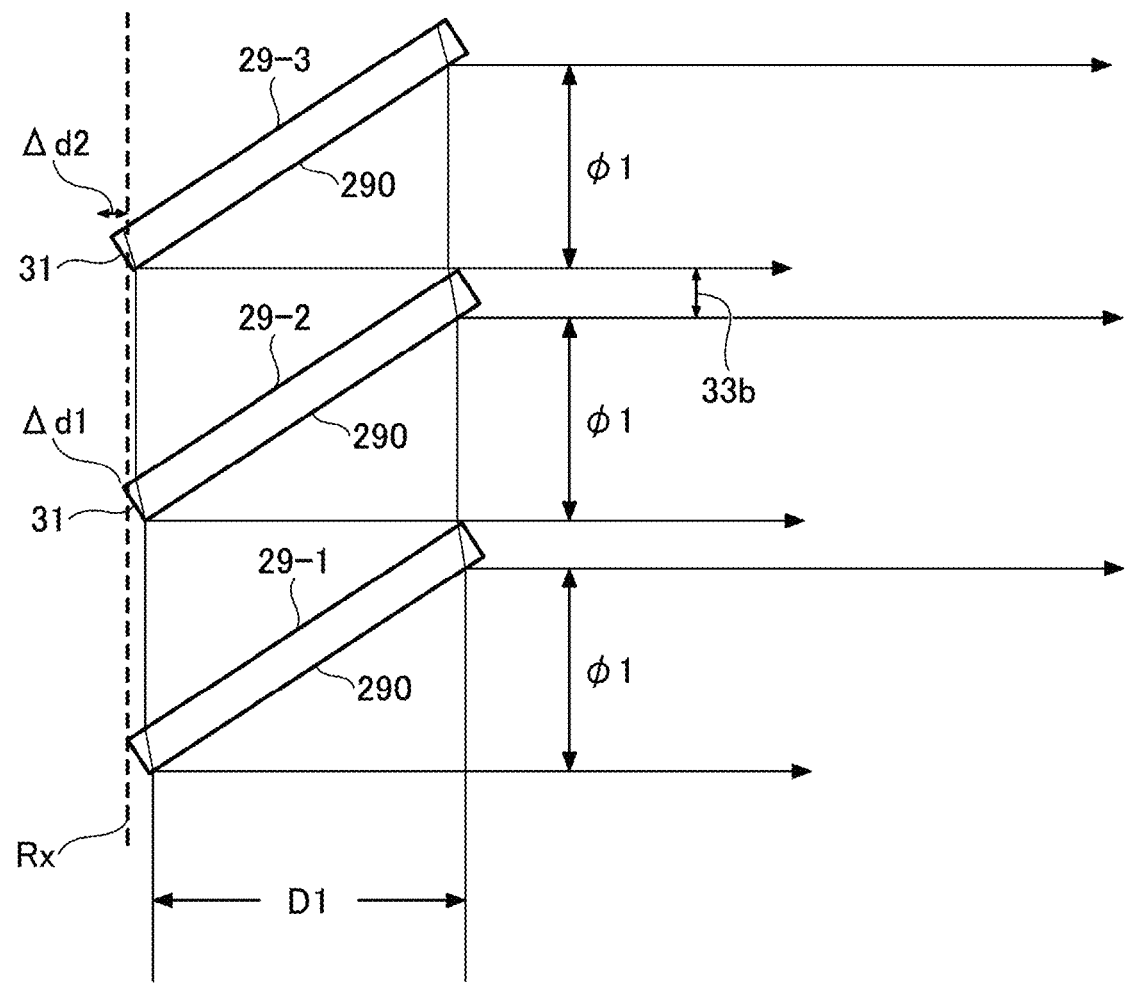
FIG. 6B schematically shows an example of the arrangement of the second optical elements.

FIG. 6A and FIG. 6B schematically show examples of the arrangement of the second optical elements 29-1 to 29-3. In FIG. 6A and FIG. 6B, the direction of arrangement of the second optical elements 29-1 to 29-3 is referred to as the X direction, the height direction of the second optical elements 29 is referred to as the Z direction, and the direction of projection by the second optical elements 29 is referred to as the Y direction.

Suppose there is a configuration in which the second optical elements 29-1 to 29-3 having a uniform width are arranged along a reference line Rx extending in the X direction without offset as shown in FIG. 6A. In this configuration, the incident light is reflected by the light incident surfaces 290 of the second optical elements 29-1 to 29-3, but a configuration in which the light is reflected by the back surfaces opposite to the light incident surfaces 290 is also applicable as described below. The beam diameter of light converted by the first optical element 27 into substantially parallel light is defined as D1. A beam diameter applicable to the second optical elements 29-1 to 29-3 is D2 smaller than D1. The beam diameter of light reflected in the Y direction by the second optical element 29-1 closest to the light source 25 is $\varphi 1$. When a portion of light transmitted through the second optical element 29-1 is incident on a lateral surface 31 of the next second optical element 29-2, the light is not reflected in the Y direction, and vignetting, that is, a loss $L_{LOST}$, occurs. When a portion of light transmitted through the second optical element 29-2 is incident on the lateral surface 31 of the next second optical element 29-3, the loss $L_{LOST}$ further increases.

Accordingly, as the distance from the light source 25 increases in the order of the second optical elements 29-2 and 29-3, the beam diameter of light projected in the Y direction decreases in the order of $\varphi 2$ and $\varphi 3$, and dark lines 33a can be formed between adjacent reflected pencils of rays. The dark lines 33a can be recognized as dark points on the stereo image to be displayed. In the case in which an LD is used for the light source 25, a comparatively narrow beam is incident on the central portions of the second optical elements 29, and the influence of the dark lines 33a is small. On the other hand, in the case in which an LED or an SLD is used for the light source 25, it is difficult to narrow down light emitted from the light source 25 to such an extent that the light is incident only on the central portions of the second optical elements 29 even when the light is collimated to produce substantially parallel light in some cases.

In the embodiment, the second optical elements 29-1 to 29-n are designed so as to suppress formation of the dark lines 33a and to evenly illuminate the irradiation surface. In FIG. 6B, the second optical elements 29-1 to 29-3 are offset in the −Y direction (side opposite to the direction of projection) from the reference line Rx as the distance from the light source 25 increases.

For example, the second optical element 29-1 closest to the light source 25 is aligned with the reference line Rx. The next second optical element 29-2 is offset in the −Y direction by Δd1 from the reference line Rx. An offset Δd2 of the third second optical element 29-3 in the −Y direction is larger than Δd1. This configuration enables the substantially parallel light converted by the collimating lenses to be transmitted through the second optical elements 29-1 to 29-3 while the light maintains the diameter D1. Light rays vignetted by the lateral surface 31 of the next second optical element 29 are minimized, which can make the beam diameter φ1 of the substantially parallel light projected in the Y direction by the second optical elements 29-1 to 29-3 substantially uniform. Even when few light rays are vignetted by the lateral surface 31 of the next second optical element 29, the size of a dark line 33b formed by vignetting is about equal to the thickness of the second optical element 29, and the dark line 33b is hardly recognized by the eye 10 of the observer as a dark point.

The widths of the second optical elements 29 can increase as the distance from the light source 25 increases instead of offsetting the positions of the second optical elements 29-1 to 29-n in the −Y direction as the distance from the light source 25 increases. Gradually increasing the widths of the second optical elements 29 can minimize light rays vignetted by the lateral surface 31 of the next second optical element 29 and make the beam diameter φ1 of the substantially parallel light projected in the Y direction substantially uniform as in FIG. 6B. Even when few light rays are vignetted by the lateral surface 31 of the next second optical element 29, the size of a dark line formed by vignetting is about equal to the thickness of the second optical element 29, and the dark line is hardly recognized by the eye 10 of the observer as a dark point.

Second Embodiment

Figure 7:
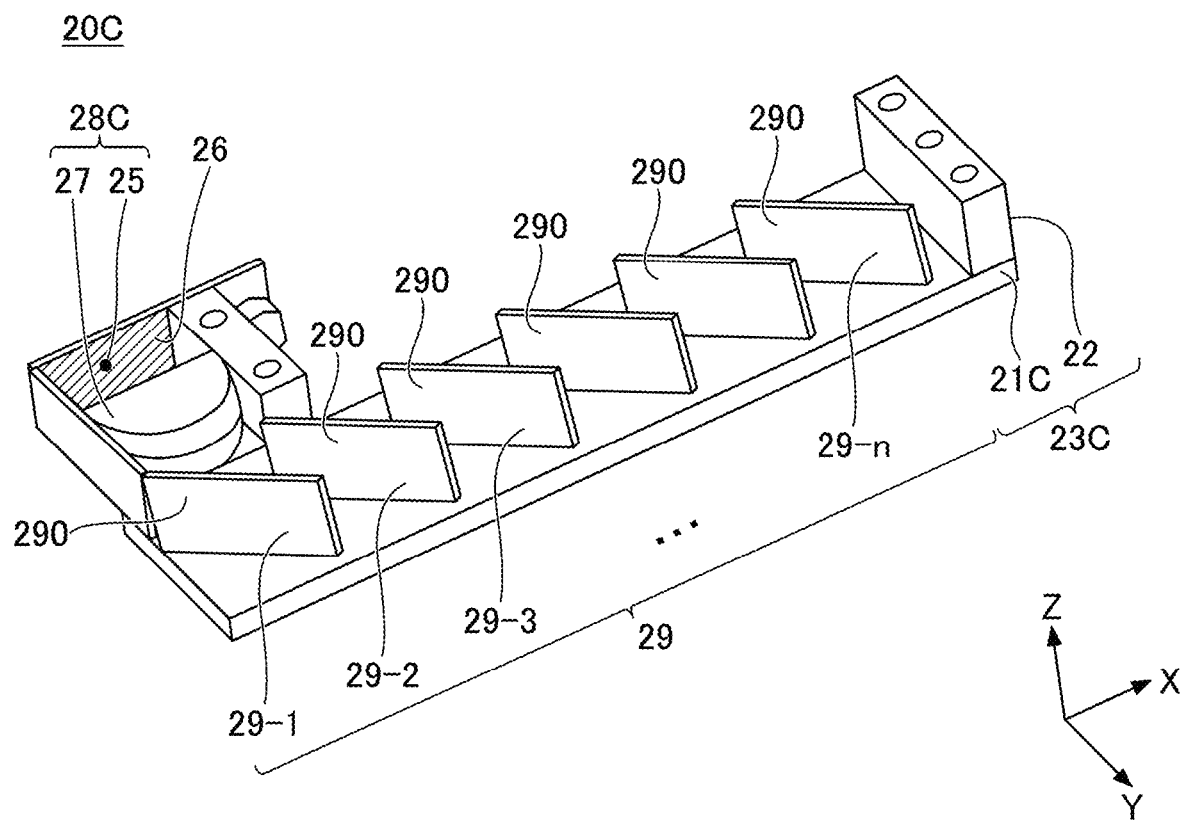
FIG. 7 schematically shows a lighting device of a second embodiment.

FIG. 7 schematically shows a lighting device 20C of a second embodiment. As with the first embodiment, the lighting device 20C includes the second optical elements 29-1 to 29-n (n is an integer of 2 or more) arranged in the X direction. The second optical elements 29-1 to 29-n are collectively referred to as the "second optical elements 29" as appropriate.

In the second embodiment, an assembly 28C including the light source 25 and the first optical element 27 is disposed in a direction (such as the −Y direction) intersecting the direction (X direction) of arrangement of the second optical elements 29-1 to 29-n. When the arrangement in the first embodiment is referred to as an I-shaped arrangement, the arrangement in the second embodiment may be referred to as an L-shaped arrangement.

The light source 25 mounted on the mounting substrate 26 is an LED, an LD, an SLD, or the like as in the first embodiment. A collimating lens, a beam expander, or the like can be used as the first optical element 27 according to the type of the light source 25 used.

The light source 25, the first optical element 27, and the second optical elements 29 are held by a casing 23C. The casing 23C can have an L-shaped lower surface 21C conforming to the L-shaped arrangement of the lighting device 20C. The second optical elements 29-1 to 29-n are fixed to the lower surface 21C inside the lateral surface 22 of the casing 23C at predetermined intervals. The second optical elements 29-1 to 29-n are inclined relative to an X axis at an angle of 40° to 50°, more preferably 42° to 48°, further preferably 44° to 46°.

Light emitted from the light source 25 and converted into substantially parallel light by the first optical element 27 is incident on the light incident surface 290 of the second optical element 29-1 located closest to the light source 25. A portion of the light is transmitted in the Y direction, and the other portion is reflected in the X direction. The substantially parallel light reflected by the second optical element 29-1 is incident on the light incident surface 290 of the next second optical element 29-2. A portion of the light is reflected in the Y direction, and the other portion is transmitted in the X direction. Thereafter, at least a portion of the incident light is successively projected in the Y direction by the second optical elements 29-3 to 29-n. The light incident surface 290 of the second optical element 29-1 closest to the light source 25 can have a reflectance of 50% or more, preferably 80% or more, more preferably 90% or more. In this case, a large portion of incident light can be reflected in the X direction, and the light can be uniformly distributed.

The light incident surface 290 of the second optical element 29-n farthest from the light source 25 can have a reflectance of 50% or more, preferably 90% or more, more preferably 95% or more. In this case, most portions of incident light can be reflected in the Y direction, and the optical loss can be reduced. The second optical elements 29-1 to 29-n are formed of beam splitters, mirrors, or glass plates having predetermined reflectances. Each of the second optical elements 29-1 to 29-n can have a dielectric mirror, a metal reflective film, or the like on the light incident surface of an optical plate made of glass, an acrylic resin, a polycarbonate, or the like or can have a diffraction grating designed to have a predetermined reflectance. The second optical elements 29-1 to 29-n can be cubic or prismatic beam splitters or mirrors instead of the plate-shaped optical elements shown in the drawings. Alternatively, a portion or the whole of the second optical elements 29-1 to 29-n can be glass blanks as described below or can be glass plates in which antireflection coatings are formed on the back surfaces of the light incident surfaces 290.

As with the first embodiment, the lighting device 20C can irradiate the entire X-Y surface from the vicinity of the X-Y surface with substantially parallel light using the single light source 25. Specifically, the X-Y surface can be irradiated with substantially parallel light without gaps, in other words, evenly. The assembly 28C including the light source 25 and the first optical element 27 is disposed such that the L shape is formed with the array of the second optical elements 29-1 to 29-n, so that three or more lighting devices 20C aligned in the X direction can be used. Further, the casing 23C can be disposed along and near a side of the display panel 11 or the stereo display sheet 12.

Figure 8:
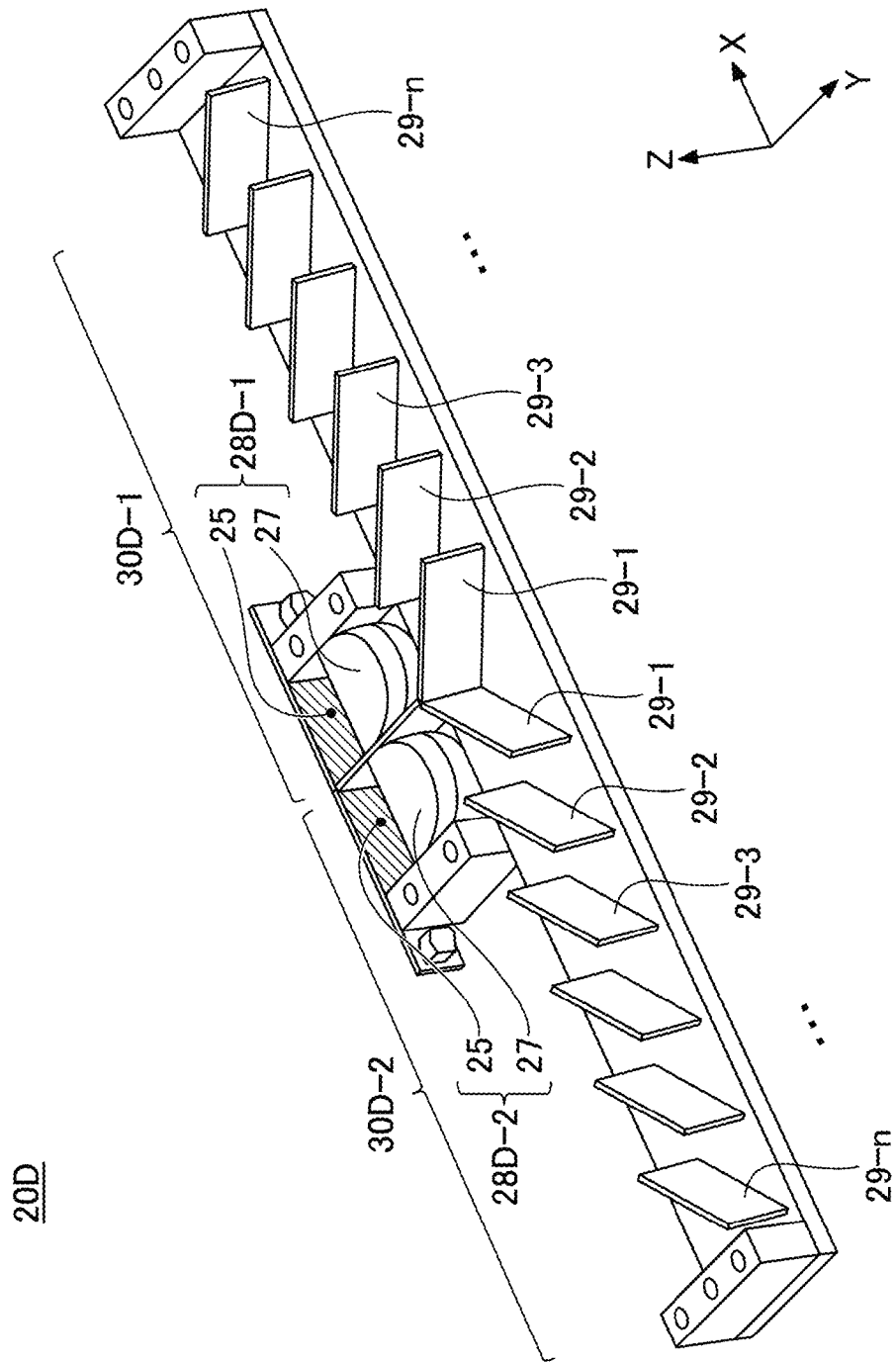
FIG. 8 schematically shows a modification of the lighting device of the second embodiment.

FIG. 8 schematically shows a modification of the lighting device of the second embodiment. A lighting device 20D includes a first unit 30D-1 and a second unit 30D-2 each including the light source 25, the first optical element 27, and the second optical elements 29-1 to 29-n. Each unit may be collectively referred to as a "unit 30D" as appropriate. In this example, an assembly 28D-1 of the first unit 30D-1 and an assembly 28D-2 of the second unit 30D-2 are disposed at the central portion in the X direction, and substantially parallel light converted by the first optical element 27 is projected in the Y direction while the light is guided from the center toward both ends in the X direction.

The configuration in FIG. 8 is effective when a stereo display sheet 12 having a large area is illuminated. The number of the light sources 25 disposed at the center in the X direction is only two, and light guided from the central portion to both ends is successively projected in the Y direction, so that interference of light between the light sources 25 is reduced. Most portions of the light can be projected in the Y direction in a comparatively short optical path length before the influence of the divergence of the substantially parallel light increases, so that interference between adjacent reflected pencils of rays is also reduced.

The wavelengths of the light sources 25 used in the first unit 30D-1 and the second unit 30D-2 can be the same or different. According to the line drawing engraved in the stereo display sheet 12, a color stereo image 15 can be displayed in the air by irradiating half the irradiation surface with white light and irradiating the other half with green light. In the configuration in FIG. 8, light sources 25 having different wavelengths can be combined because interference between adjacent reflected pencils of rays is reduced.

Figure 9:
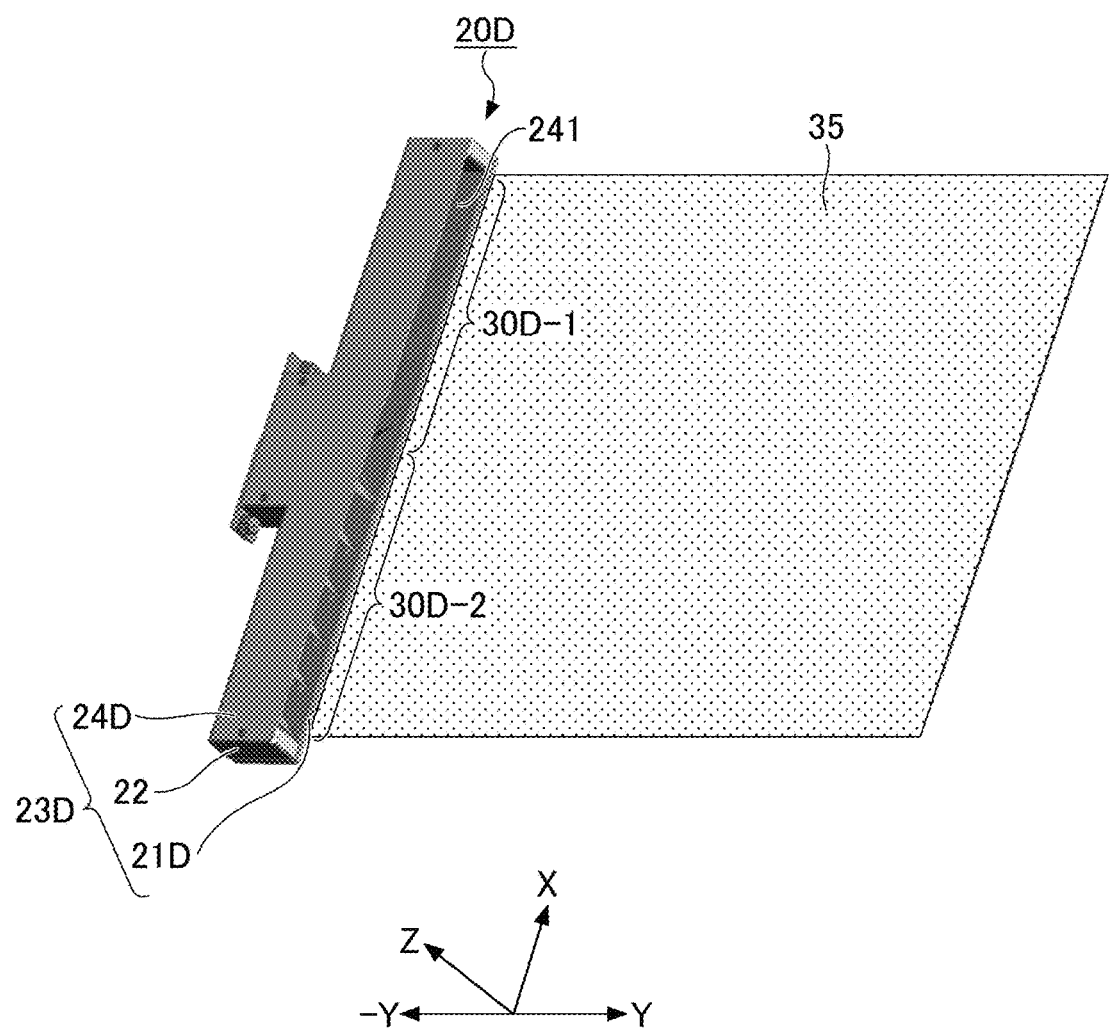
FIG. 9 schematically shows an irradiation state of the lighting device in FIG. 8.

FIG. 9 schematically shows an irradiation state of the lighting device 20D in FIG. 8. In FIG. 8, the lighting device 20D can include a casing 23D housing the first unit 30D-1 and the second unit 30D-2. The casing 23D has an upper surface 24D in addition to a lower surface 21D and the lateral surface 22. In each of the first unit 30D-1 and the second unit 30D-2, substantially parallel light is at least partially projected successively in the Y direction while the light is guided from the center toward both ends in the X direction.

The cover 241 can be disposed on the light exit side of the lighting device 20D as in the first embodiment. The cover 241 can be subjected to an optical treatment to guide the light beam 35 projected in the Y direction by each of the second optical elements 29-1 to 29-n obliquely downward such that the entire X-Y surface is irradiated with the light beam 35 projected in the Y direction. The second optical elements 29-1 to 29-n arranged in the X direction can be gradually offset in the −Y direction as the distance from the light source 25 increases (see FIG. 6B). Alternatively, the widths of the second optical elements 29-1 to 29-n can gradually increase as the distance from the light source 25 increases.

Figure 10A:
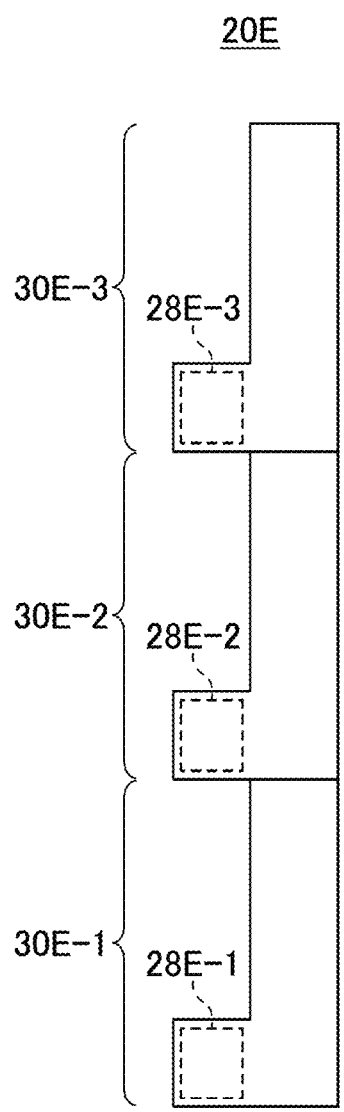
FIG. 10A schematically shows another modification of the lighting device of the second embodiment.
Figure 10B:
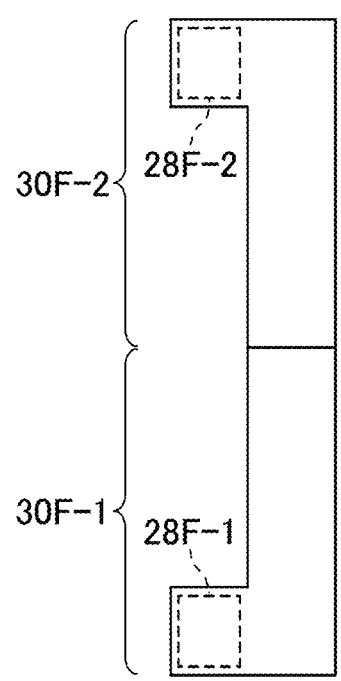
FIG. 10B schematically shows still another modification of the lighting device of the second embodiment.

FIG. 10A and FIG. 10B schematically show still other modifications of the lighting device of the second embodiment. In FIG. 10A, a lighting device 20E includes a first unit 30E-1, a second unit 30E-2, and a third unit 30E-3 that each have an L shape and are repeatedly arranged in the same orientation in the X direction. Assemblies 28E-1, 28E-2, and 28E-3 each including the light source 25 and the first optical element 27 are respectively housed in projecting portions of the L shapes.

The configuration in FIG. 10A is suitable for irradiating a stereo display sheet 12 having a large area. The number of units is not limited to three, and repeatedly arranging four or more units allows a display medium long in one direction (X direction) to be appropriately irradiated.

In FIG. 10B, a lighting device 20F includes a first unit 30F-1 and a second unit 30F-2. The first unit 30F-1 and the second unit 30F-2 each of which has an L shape are arranged along the X direction in opposite orientations. Assemblies 28F-1 and 28F-2 each including the light source 25 and the first optical element 27 are disposed at both ends in the X direction. Light emitted from the light source 25 and converted into substantially parallel light by the first optical element 27 is successively projected in the Y direction while the light is guided from both ends toward the center in the X direction. By setting the reflectance of the second optical element 29 located at the central portion in the X direction, the optical loss and interference can be reduced.

The configuration in FIG. 10B is also suitable for irradiating a stereo display sheet 12 having a large area. The number of units is not limited to two, and repeatedly arranging three or four units allows a display medium long in one direction (X direction) to be appropriately irradiated.

Also in the case in which the configuration in FIG. 10A or FIG. 10B is employed, the cover 241 (see FIG. 9) can be disposed on the light exit side of the lighting device 20E or 20F. The cover 241 can be subjected to an optical treatment to guide light projected in the Y direction obliquely downward such that the X-Y surface is irradiated with the substantially parallel light projected in the Y direction. The second optical elements 29-1 to 29-n arranged in the X direction can be gradually offset in the −Y direction as the distance from the light source 25 increases, or the widths of the second optical elements 29-1 to 29-n can gradually increase as the distance from the light source 25 increases. This configuration reduces the formation of dark lines and enables the irradiation surface to be evenly illuminated.

Third Embodiment

Figure 11:
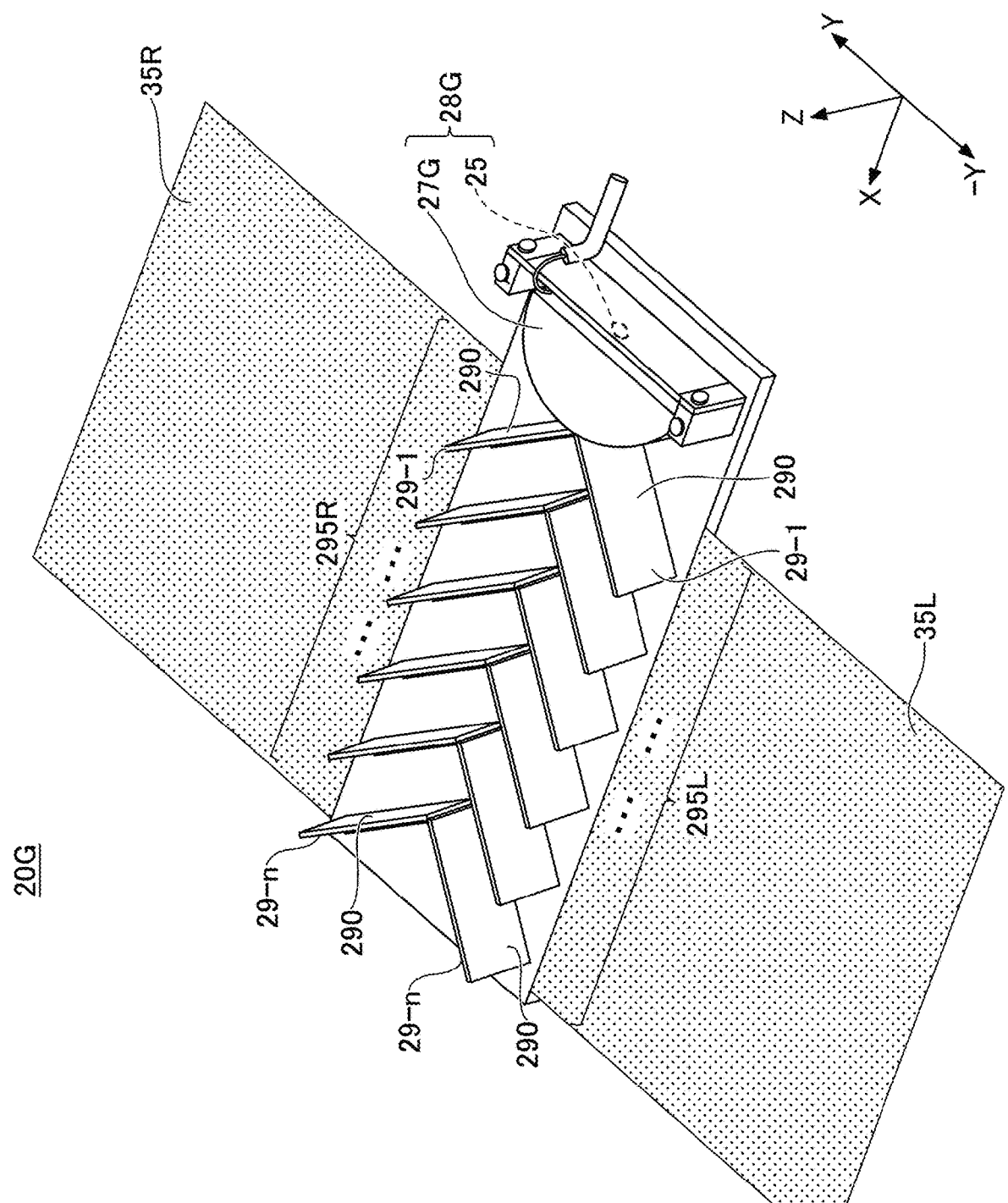
FIG. 11 schematically shows a lighting device of a third embodiment.

FIG. 11 schematically shows a lighting device 20G of a third embodiment. The lighting device 20G includes the single light source 25, a single first optical element 27G, and two arrays of the second optical elements 29-1 to 29-n arranged in parallel. One array of the second optical elements 29-1 to 29-n is referred to as a first array 295R, and the other array of the second optical elements 29-1 to 29-n is referred to as a second array 295L. The first array 295R and the second array 295L may be collectively referred to as the "arrays 295" as appropriate. The second optical elements 29-1 to 29-n are arranged in the X direction in each of the first array 295R and the second array 295L, but the direction of inclination of the light incident surfaces 290 of the second optical elements 29-1 to 29-n included in the first array 295R relative to the X axis is opposite to the direction of inclination of the light incident surfaces 290 of the second optical elements 29-1 to 29-n included in the second array 295L relative to the X axis.

In the first array 295R and the second array 295L each including the second optical elements 29-1 to 29-n, the second optical elements 29-1 to 29-n can be offset in opposite directions (that is, the −Y direction and the +Y direction) along the direction of projection of light as the distance from an assembly 28G increases. Alternatively, the widths of the second optical elements 29-1 to 29-n can increase as the distance from the assembly 28G increases. A cover can be disposed on the light exit side of each of the first array 295R and the second array 295L arranged in parallel. The cover can be subjected to an optical treatment to guide light reflected by the first array 295R on the right side as viewed from the light source 25 obliquely downward to the right and to guide light reflected by the second array 295L on the left side obliquely downward to the left.

The lighting device 20G can project light beams 35R and 35L in opposite directions, that is, the +Y direction and the −Y direction, using only one assembly 28G including the light source 25 and the first optical element 27G. For example, the lighting device 20G is suitably used for a configuration in which a plurality of stereo display sheets are arranged in a single direction (Y direction), such as ticket machines and billboards. With the single lighting device 20G, a stereo image on two adjacent display surfaces can be displayed.

<Optical Characteristics of Second Optical Elements>

The optical characteristics of the second optical elements 29-1 to 29-n with varying design parameters of the lighting device 20 are shown below. Throughout Examples 1 to 8 below, an LED is used as the light source 25, and a collimating lens is used as the first optical element 27. Optical characteristics are calculated with varying number of units 30 each constituted of the light source 25, the first optical element 27, and the second optical elements 29-1 to 29-n and the type and reflectance of the second optical elements 29.

Example 1

Figure 12:
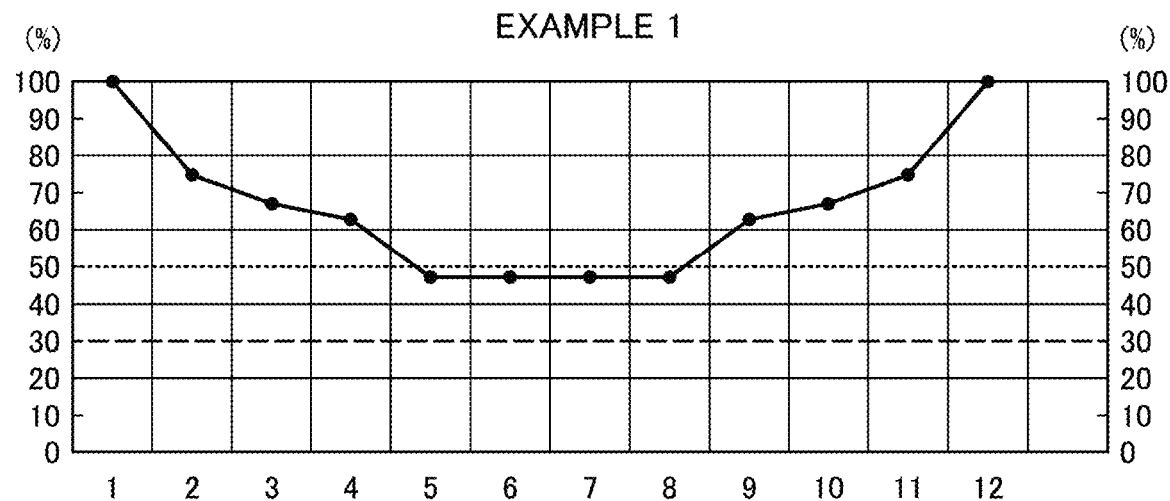
FIG. 12 schematically shows optical characteristics in Example 1.

FIG. 12 schematically shows reflection characteristics of the second optical elements 29-1 to 29-n in Example 1. Example 1 employs the configuration of the I-shaped lighting device 20B in FIG. 3. Two units 30B each including the light source 25, the first optical element 27, and the second optical elements 29-1 to 29-n are used, and the assemblies 28B each including the light source 25 and the first optical element 27 are disposed at both ends in the X direction. Each unit 30B includes 6 second optical elements 29-4 to 29-6, and a total of 12 second optical elements 29 are arranged symmetrically about the center in the X direction.

The horizontal axis in FIG. 12 shows the consecutive numbers of the second optical elements 29, and the vertical axis shows normalized light emission amounts of the second optical elements 29. The consecutive numbers of the second optical elements are referred to as "mirror numbers." Among the amounts of light emitted from the second optical elements 29, the highest light emission amount is normalized to 100%.

The 12 second optical elements 29 are plate-shaped beam splitters (BS). The mirror numbers 1 to 6 correspond to the second optical elements 29-1 to 29-6 of the first unit 30B-1, and the mirror numbers 7 to 12 correspond to the second optical elements 29-6 to 29-1 of the second unit 30B-2. The relationship between the mirror numbers and the reflectance is as follows.

| Mirror number | Reflectance |
| --- | --- |
| 1 | 25.0% |
| 2 | 25.0% |
| 3 | 30.0% |
| 4 | 40.0% |
| 5 | 50.0% |
| 6 | 100.0% |
| 7 | 100.0% |
| 8 | 50.0% |
| 9 | 40.0% |
| 10 | 30.0% |
| 11 | 25.0% |
| 12 | 25.0% |

The reflectances of the respective sixth and seventh beam splitters of the first unit 30B-1 and the second unit 30B-2 farthest from the light sources 25 are 100%, and light incident on the light incident surfaces is entirely reflected. The utilization efficiency of light is the maximum.

In Example 1, the light emission amount gradually decreases from the outer beam splitters to the central beam splitters, and the normalized light emission amounts of the central beam splitters are about 50%. The difference in amount of light in the irradiation surface is about 50%. In the case where the light emission amount continuously changes, a human eye does not recognize the change even when the normalized light emission amount drops to 30%. Accordingly, the difference in amount of light in the irradiation surface in Example 1 is good. Light is substantially entirely reflected in the Y direction by the six mirrors from both sides in the X direction, the divergence of reflected light is thus small, and the interference between reflected pencils of rays is negligible.

Example 2

Figure 13:
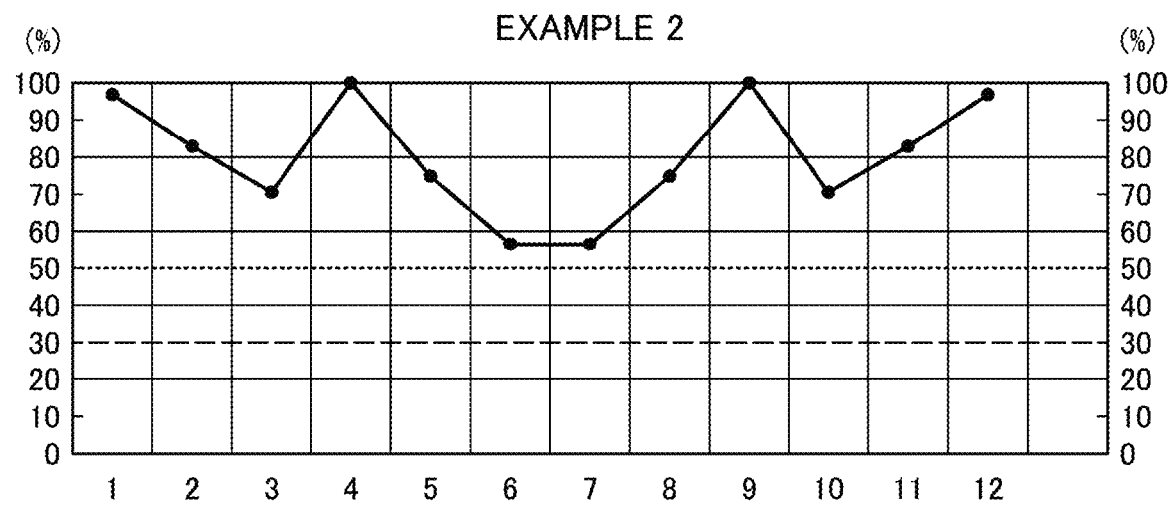
FIG. 13 schematically shows optical characteristics in Example 2.

FIG. 13 schematically shows reflection characteristics of the second optical elements 29-1 to 29-n in Example 2. In Example 2, the configuration of the I-shaped lighting device 20B in FIG. 3 is employed, and a total of 12 beam splitters (mirror numbers 1 to 12) are used as the second optical elements 29 as in Example 1. It is noted that the reflectances of the beam splitters are only 2 types, that is, 15.0% and 25.0%. The relationship between the mirror numbers and the reflectance is as follows.

| Mirror number | Reflectance |
| --- | --- |
| 1 | 15.0% |
| 2 | 15.0% |
| 3 | 15.0% |
| 4 | 25.0% |
| 5 | 25.0% |
| 6 | 25.0% |
| 7 | 25.0% |
| 8 | 25.0% |
| 9 | 25.0% |
| 10 | 15.0% |
| 11 | 15.0% |
| 12 | 15.0% |

In Example 2, the light emission amount gradually decreases through the three outer beam splitters, the normalized light emission amount increases through the fourth and ninth beam splitters because the central beam splitters have large reflectances, and the normalized light emission amount then decreases toward the center. The normalized light emission amount is kept at 50% or more at the innermost beam splitters, and the difference in amount of light in the irradiation surface is good. A portion of incident light is not reflected by the central mirror, and a small amount of optical loss is caused. The mirror is the last mirror in the transmission direction, and the optical loss is negligible because the amount of incident light is small. Most of light is reflected by the six mirrors from both sides in the X direction, the divergence of reflected light is thus small, and the interference between reflected pencils of rays is negligible.

Example 3

Figure 14:
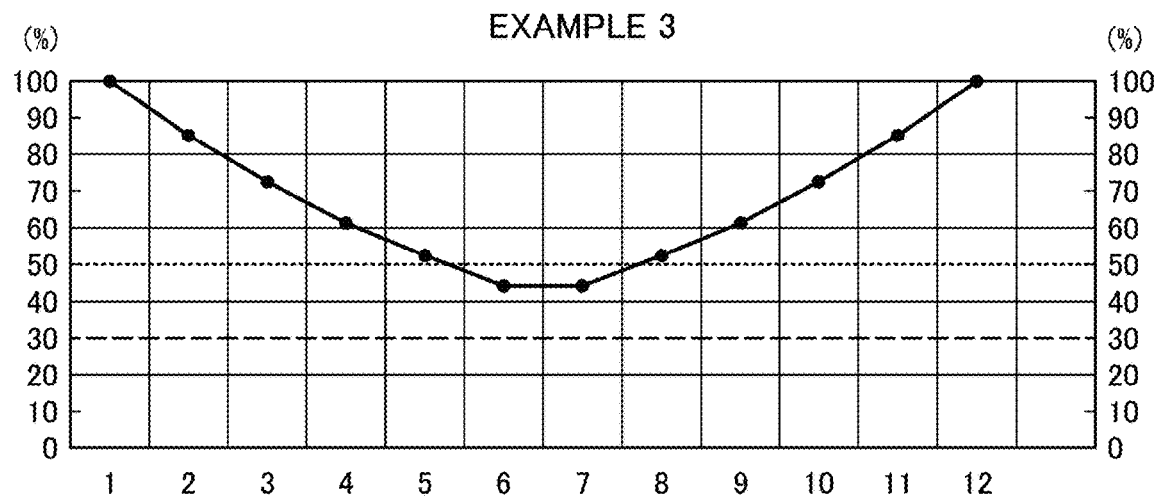
FIG. 14 schematically shows optical characteristics in Example 3.

FIG. 14 schematically shows reflection characteristics of the second optical elements 29-1 to 29-n in Example 3. In Example 3, the configuration of the I-shaped lighting device 20B in FIG. 3 is employed, and a total of 12 beam splitters (mirror numbers 1 to 12) are used as the second optical elements 29 as in Example 1 and Example 2. It is noted that the reflectances of the beam splitters are only 1 types, that is, 15.0%. That is, all the mirror numbers 1 to 12 have a reflectance of 15.0%.

In Example 3, the light emission amount gradually decreases from the outer beam splitter to the inner beam splitter. At the innermost beam splitter, the normalized light emission amount is slightly below 50% but is greatly above a normalized light emission amount of 30%. The difference in amount of light in the irradiation surface is slightly less than 50%, which is good. The central mirror does not reflect 85% of incident light, and a small amount of optical loss is caused. The utilization efficiency of light is within an acceptable range. Most of light is reflected in the Y direction by the six mirrors from both sides in the X direction, the divergence of reflected light is thus small, and the interference between reflected pencils of rays is negligible.

Example 4

Figure 15:
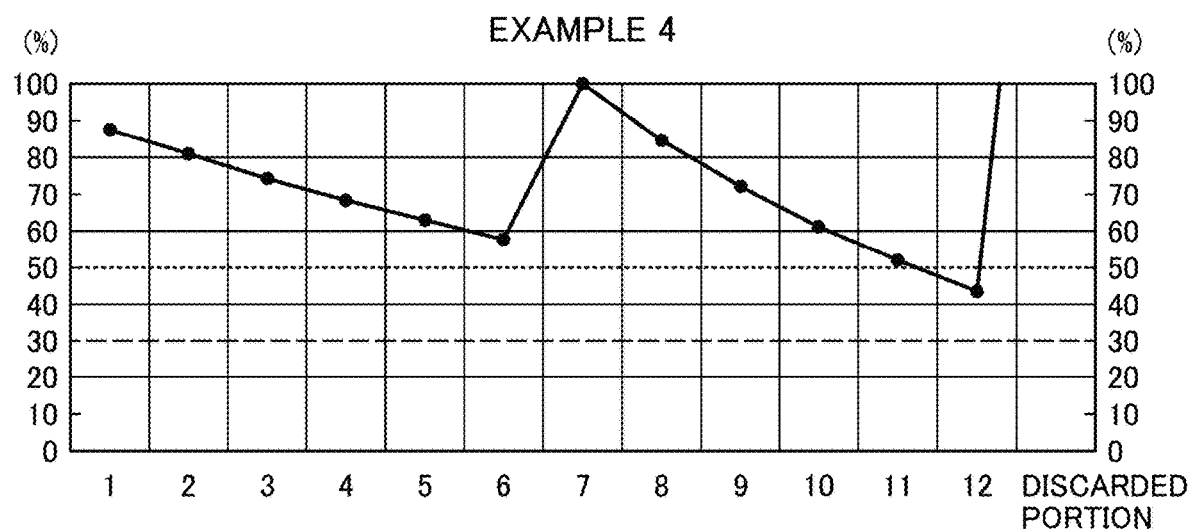
FIG. 15 schematically shows optical characteristics in Example 4.

FIG. 15 schematically shows reflection characteristics of the second optical elements 29-1 to 29-n in Example 4. In Example 4, the configuration of the lighting device 20A in FIG. 2 is employed, and a single LED light source 25 and a single collimating lens as the first optical element 27 are used. As the second optical elements 29, 12 successive beam splitters (mirror numbers 1 to 12) are used. The reflectances of the beam splitters are only 2 types, that is, 8.0% and 15.0%. The relationship between the mirror numbers and the reflectance is as follows.

| Mirror number | Reflectance |
| --- | --- |
| 1 | 8.0% |
| 2 | 8.0% |
| 3 | 8.0% |
| 4 | 8.0% |
| 5 | 8.0% |
| 6 | 8.0% |
| 7 | 15.0% |
| 8 | 15.0% |
| 9 | 15.0% |
| 10 | 15.0% |
| 11 | 15.0% |
| 12 | 15.0% |

In Example 4, light emitted from the single light source 25 is projected in the Y direction by 12 beam splitters. The reflectances of the seventh and subsequent beam splitters are higher than the reflectances of the first to sixth beam splitters. The first to sixth beam splitters gradually reduce the light emission amount. The normalized light emission amount once reaches the maximum at the seventh beam splitter, and the normalized light emission amount monotonously decreases after the eighth beam splitter. The normalized light emission amount is kept at 50% or more at the first to eleventh beam splitters and is only slightly below 50% even at the last beam splitter. The difference in amount of light in the irradiation surface is about 50%, which is good. A portion of light is not reflected by the last beam splitter, and a small amount of optical loss is caused. The optical loss is negligible because the amount of incident light is small. The utilization efficiency of light is within an acceptable range. Substantially parallel light is generated by the first optical element 27, but the influence of divergence is produced because the optical path length is long. The divergence and interference of pencils of rays can be caused by the eleventh and twelfth beam splitters. If the optical path length further increases, the interference between pencils of rays reflected by the last two beam splitters increases, and a single display image can be seen as a plurality of images in a stereo display image. In the configuration in Example 4, the image is within an acceptable range as the stereo display.

Example 5

Figure 16:
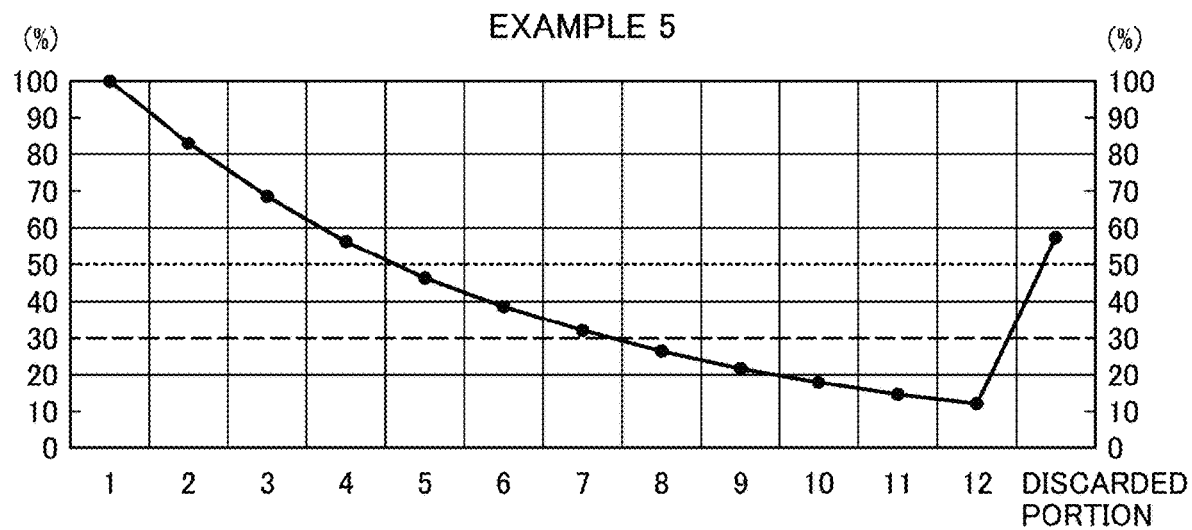
FIG. 16 schematically shows optical characteristics in Example 5.

FIG. 16 schematically shows reflection characteristics of the second optical elements 29-1 to 29-n in Example 5. In Example 5, the configuration of the lighting device 20A in FIG. 2 is employed, and a single LED light source 25 and a single collimating lens as the first optical element 27 are used. As the second optical elements 29, 12 successive glass blanks (mirror numbers 1 to 12) are used. Reflective coatings are not formed on the glass blanks, but all the glass blanks have a reflectance of 17.5% because of Fresnel reflection caused when light is incident on an interface between media having different refractive indices. The thickness of the glass blanks is 1.0 mm. The distance between the emission point of light reflected on the front surface of the glass blank and the emission point of light reflected on the back surface is 0.74 mm.

In Example 5, the normalized light emission amount is 30% or more up to the seventh glass blank, but the normalized light emission amount drops below 30% after the eighth glass blank. The difference in amount of light in the irradiation surface is about 80% at the maximum, but the difference in amount of light is unlikely to be recognized in a stereo display image because the normalized light emission amount continuously changes. The difference in amount of light in the irradiation surface is within an acceptable range. A slight optical loss is caused due to light not reflected by the twelfth glass blank, but the loss is negligible. The utilization efficiency of light is very good. Light reflected on the front surface of the glass blank and light reflected by the back surface interfere with each other, but the interference is within an acceptable range. The configuration of Example 5 is very effective in view of the cost.

Example 6

Figure 17:
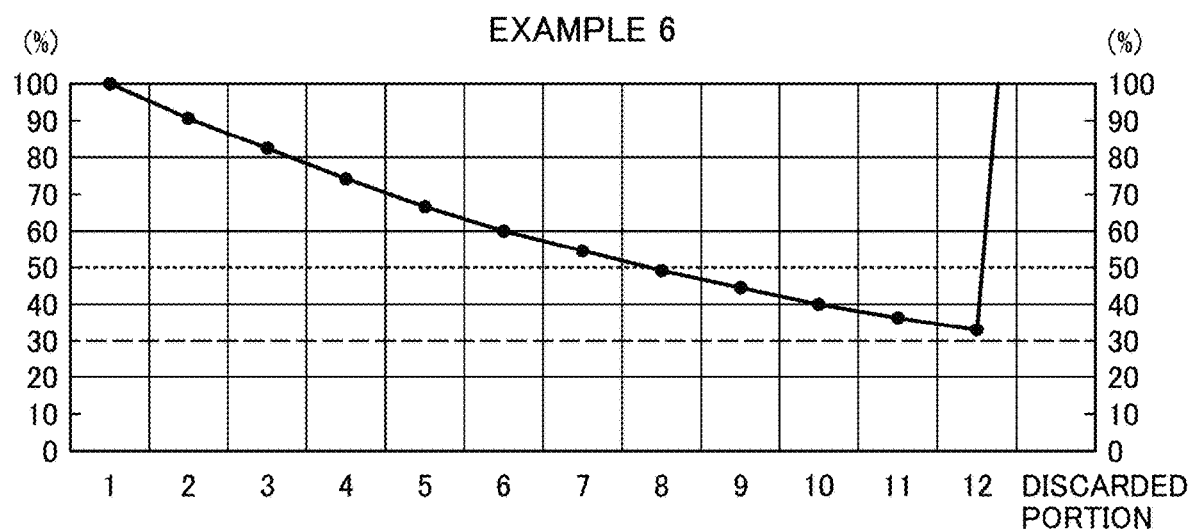
FIG. 17 schematically shows optical characteristics in Example 6.

FIG. 17 schematically shows reflection characteristics of the second optical elements 29-1 to 29-n in Example 6. In Example 6, the configuration of the lighting device 20A in FIG. 2 is employed, and a single LED light source 25 and a single collimating lens as the first optical element 27 are used. As the second optical elements 29, 12 successive glass blanks (mirror numbers 1 to 12) are used. Anti-reflection (AR) coatings can be formed on the back surfaces of the glass blanks. The reflectances of the AR-coated glass blanks are uniform and are 9.7%. Reflection on the back surfaces is reduced because the AR coatings are formed on the back surfaces of the glass blanks, and interference between light reflected on the front surfaces of the glass blanks and light reflected on the back surfaces is reduced. The thickness of each AR-coated glass blank is 1.0 mm, and the distance between the emission points of light reflected on the front surface and the back surface of the AR-coated glass blank is 0.74 mm.

In Example 6, a normalized light emission amount of 30% or more is maintained up to the twelfth AR-coated glass blank. A human eye therefore does not recognize the successive change in normalized light emission amount, and the difference in amount of light in the irradiation surface is within an acceptable range. The optical loss is caused due to light not reflected by the twelfth glass blank, but the utilization efficiency of light is within an acceptable range.

Interference between reflected pencils of rays on the mirror numbers 11 and 12 can be caused because the optical path length is long, but the interference is also within an acceptable range. The configuration of Example 6 is very advantageous in view of the cost, and the quality of the stereo display image is better than the quality in Example 5.

Example 7

Figure 18:
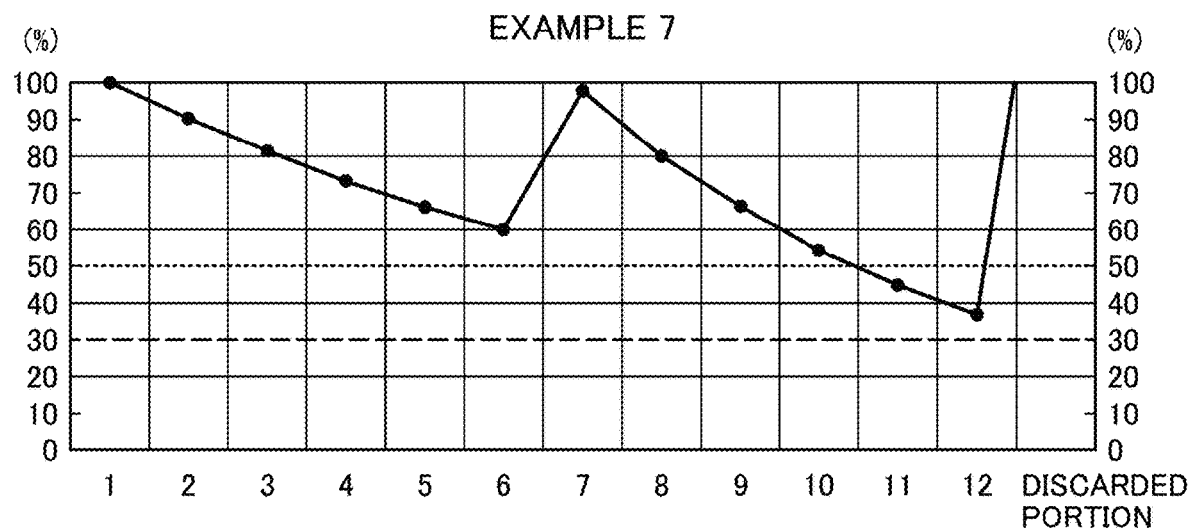
FIG. 18 schematically shows optical characteristics in Example 7.

FIG. 18 schematically shows reflection characteristics of the second optical elements 29-1 to 29-n in Example 7. In Example 7, the configuration of the lighting device 20A in FIG. 2 is employed, and a single LED light source 25 and a single collimating lens as the first optical element 27 are used. As the second optical elements 29, only 12 successive glass blanks are used. The back surfaces of the glass blanks of the mirror numbers 1 to 6 are AR-coated. The reflectances of the AR-coated glass blanks are 9.7%. The glass blanks of the mirror numbers 7 to 12 are not coated. The reflectances of the glass blanks without coating are 17.5%. Throughout the mirror numbers 1 to 12, the thickness of the glass blank is 1.0 mm, and the distance between the emission points of light reflected on the front surface and the back surface of the glass blank is 0.74 mm.

The normalized light emission amount monotonously decreases through the mirror numbers 1 to 6, and the normalized light emission amount once increases at the mirror number 7 and monotonously decreases again after the mirror number 8. In Example 7, a normalized light emission amount of 50% or more is maintained up to the mirror number 10, a normalized light emission amount of about 40% is maintained also at the mirror numbers 11 and 12, and the difference in amount of light in the irradiation surface is within an acceptable range. The optical loss is smaller than in Example 6, and the utilization efficiency of light is good. Interference between reflected pencils of rays on the mirror numbers 11 and 12 can be caused because the optical path length is long as in Examples 5 and 6, but the interference is within an acceptable range. The configuration of Example 7 is very advantageous in view of the cost, and the quality of the stereo display image is better than the quality in Example 5.

Example 8

Figure 19:
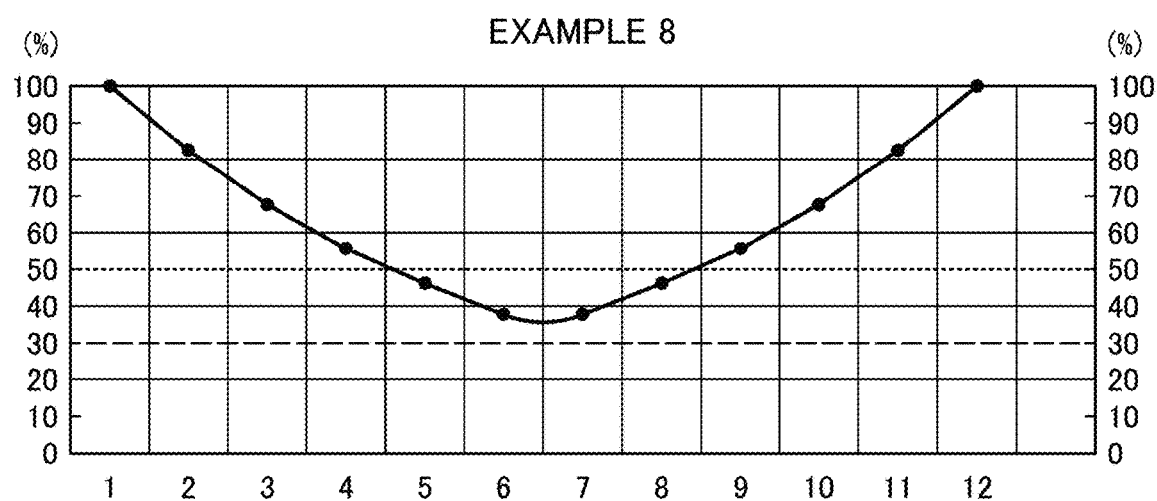
FIG. 19 schematically shows optical characteristics in Example 8.

FIG. 19 schematically shows reflection characteristics of the second optical elements 29-1 to 29-n in Example 8. In Example 8, the configuration of the lighting device 20B in FIG. 3 is employed as in Examples 1 to 3, and two units 30 each constituted of the LED light source 25, the first optical element 27, and the second optical elements 29-1 to 29-n are used. Glass blanks without coatings are used as the second optical elements. The number of glass blanks included in each unit 30 is 6, and a total of 12 glass blanks are used. The thickness of each glass blank is 0.5 mm, and the distance between the emission points of light reflected on the front surface and the back surface of the glass blank is 0.37 mm.

The normalized light emission amount is kept at 40% or more throughout the mirror numbers 1 to 12, and the difference in amount of light in the irradiation surface is within an acceptable range. The optical loss is smaller than in Example 6, and the utilization efficiency of light is sufficiently within an acceptable range. The distance between the emission points of light reflected on the front and back surfaces of the glass blank decreases by the decrease in thickness of the glass blank, and interference of reflected light is reduced. The optical path length of each unit is half the length in Examples 4 to 7, and interference between adjacent reflected pencils of rays is therefore reduced. The configuration of Example 8 is very advantageous in view of the cost.

FIG. 20 summarizes specifications and performance of Examples 1 to 8. The utilization efficiency of light, the difference in amount of light in the irradiation surface, the cost, and coherence of pencils of rays are evaluated with varying number (indicated as the number of sets in the drawing) of units each constituted of an LED, a collimating lens, and a plurality of second optical elements 29 and a varying type of the second optical elements (mirrors). The interference of pencils of rays include interference due to beam divergence caused by increase in optical path length and interference of pencils of rays reflected on the front surface and the back surface of the second optical element. A double circle indicates a very good evaluation result. A circle indicates a good evaluation result. A triangle indicates an evaluation result within an acceptable range.

Throughout Examples 1 to 8, the utilization efficiency of light is evaluated to be within an acceptable range or higher. Particularly in Example 1 and Example 5, the optical loss is small, and the utilization efficiency of light is very good. The difference in amount of light in the irradiation surface is evaluated to be within an acceptable range or better throughout Examples 1 to 8. Particularly in Examples 1 to 4, the difference in amount of light in the irradiation surface is within a range of about 50%, which is good. In terms of the cost, the cost tends to be high in Examples 1, 2, and 4 employing beam splitters having different reflectances but is within an acceptable range. Example 3 employing beam splitters having a single reflectance is advantageous as compared with Examples 1, 2, and 4 in view of the cost. Examples 5 to 8 employing glass blanks are good in view of the cost. In terms of interference of pencils of rays, divergence of light can be sufficiently reduced by reducing the optical path length in Examples 1 to 3 and 8 employing two units. Interference of light reflected on the front and back surfaces of the element is sufficiently reduced in Examples 1 to 3 employing beam splitters and Example 8 employing thin glass blanks. Any of the configurations in Examples 1 to 8 can be appropriately selected according to the priority. According to the optical path length, an LD can be used as the light source 25 instead of an LED, and a beam expander can be used as the first optical element 27.

The lighting device 20 and application examples of the lighting device 20 have been described above with reference to specific configuration examples, but the present invention is not limited to the above configuration examples. The arrangement, the number, and the like of each component of the lighting device are not limited by Examples 1 to 8, and the number of the second optical elements 29 included in each unit can be appropriately set according to the type of the light source 25 to be used. The second optical element 29 farthest from the light source 25 can be a mirror or a beam splitter having a reflectance of 90% or more, and glass blanks or AR-coated glass blanks can be used for the other second optical elements 29. The casing 23A of the lighting device 20A in FIG. 2 and the casing 23C of the lighting device 20C in FIG. 7 can have the upper surface 24. When a stereo display sheet 12 having a large area is illuminated, three or more units 30 can be repeatedly arranged in FIG. 10A or FIG. 10B. In any case, the irradiation surface can be irradiated with substantially parallel light over a wide area without gaps, in other words, evenly.

A stereo image of a touch screen can be displayed in the air by combining a sensor with the display 1 employing the lighting device 20 of the embodiment to obtain a noncontact input device. The lighting device 20 of the embodiment is generally applicable to applications that require substantially parallel light, such as street advertising lights and projectors. The lighting device can be used as a lighting device that uniformly illuminates the irradiation surface, so that, for example, a disinfector employing a UV light source can be obtained. A surface of a desk or the like can be the irradiation surface, or UV light can be applied such that an invisible disinfected surface is formed in a space. A plurality of light sources 25 can be arranged in the Z direction, and two irradiation surfaces can be arranged in the Z direction. A position near the disinfected surface can be visualized by employing UV light for one and visible light for the other.

The invention claimed is:

1. A lighting device comprising:
a light source;
a first optical element configured to convert light emitted from the light source into substantially parallel light; and
a plurality of second optical elements arranged in a first direction,
wherein each of the plurality of second optical elements has a light incident surface,
wherein each of the plurality of second optical elements guides at least a portion of the substantially parallel light incident on the light incident surface in a second direction intersecting the first direction and guides another portion in the first direction,
wherein each of the plurality of second optical elements has a lateral surface provided at a farthest location of each respective second optical element of the plurality of second optical elements in a direction opposite to the second direction, and
wherein the lateral surface of each of the plurality of second optical elements is offset in the direction opposite to the second direction as compared to the lateral surface of an adjacent second optical element of the plurality of optical elements as a distance from the light source increases.

2. The lighting device according to claim 1, wherein each of the plurality of second optical elements has a same width of the light incident surface.

3. The lighting device according to claim 1, wherein each of the plurality of second optical elements has a respective width of the light incident surface that is larger, as compared to other second optical elements of the plurality of optical elements, as a respective distance of each of the plurality of second optical elements is farther from the light source.

4. The lighting device according to claim 1,
wherein the light source and the first optical element are disposed along the first direction, and
wherein each of the plurality of second optical elements reflects at least a portion of the substantially parallel light incident on the light incident surface in the second direction and transmits another portion in the first direction.

5. The lighting device according to claim 1,
wherein the light source and the first optical element are disposed along the second direction,
wherein one second optical element of the plurality of second optical elements closest to the light source transmits at least a portion of the substantially parallel light incident on the light incident surface in the second direction and reflects another portion in the first direction, and wherein another second optical element of the plurality of second optical elements receiving light reflected in the first direction reflects at least a portion of the substantially parallel light in the second direction and transmits another portion in the first direction.

6. The lighting device according to claim 1, further comprising a cover covering a light exit side of the plurality of second optical elements,
wherein the cover is subjected to an optical treatment to orient the substantially parallel light guided in the second direction below a plane defined by the first direction and the second direction.

7. The lighting device according to claim 1, further comprising a plurality of units each including the light source, the first optical element, and the second optical elements,
wherein the plurality of units are arranged along the first direction.

8. The lighting device according to claim 1, wherein the light incident surface of each of the plurality of second optical elements is inclined relative to the first direction at an angle of 40° to 50°.

9. A display comprising:
a display panel;
a stereo display sheet disposed on the display panel; and
the lighting device according to claim 1 disposed above and along a side of the display panel.

10. A lighting device comprising:
a light source;
a first optical element configured to convert light emitted from the light source into substantially parallel light; and
a plurality of second optical elements, wherein
each of the plurality of second optical elements has a light incident surface,
a first array of second optical elements of the plurality of second optical elements is arranged so as to at least partially overlap with each other when viewed in a first direction,
a second array of second optical elements of the plurality of second optical elements is arranged so as to at least partially overlap with each other when viewed in the first direction, the second array being offset from the first array in a second direction intersecting the first direction when viewed in the first direction,
each of the second optical elements of the first array of second optical elements guides at least a portion of the substantially parallel light incident on the light incident surface in the second direction and guides another portion in the first direction, and
each of the second optical elements of the second array of second optical elements guides at least a portion of the substantially parallel light incident on the light incident surface in a direction opposite to the second direction and guides another portion in the first direction.

11. The lighting device according to claim 10,
wherein each of the second optical elements of the first array of second optical elements are linearly arranged along a first line in the first direction, and
wherein each of the second optical elements of the second array of second optical elements are linearly arranged along a second line in the first direction, the second line being parallel to and offset from the first line.

12. The lighting device according to claim 10,
wherein each of the second optical elements of the first array of second optical elements has a lateral surface provided at a farthest location of each respective second optical element of the first array of second optical elements in the direction opposite to the second direction, and wherein the lateral surface of each of the second optical elements of the first array of second optical elements is offset in the direction opposite to the second direction as compared to the lateral surface of an adjacent second optical element of the first array of second optical elements as a distance from the light source increases.

13. The lighting device according to claim 12, wherein each of the second optical elements of the first array of second optical elements has a same width of the light incident surface.

14. The lighting device according to claim 12, wherein each of the second optical elements of the second array of second optical elements has a lateral surface provided at a farthest location of each respective second optical element of the second array of second optical elements in the second direction, and wherein the lateral surface of each of the second optical elements of the second array of second optical elements is offset in the second direction as compared to the lateral surface of an adjacent second optical element of the second array of second optical elements as a distance from the light source increases.

15. The lighting device according to claim 10, wherein the light incident surfaces of the second optical elements in the first array of second optical elements and the light incident surfaces of the second optical elements in the second array of second optical elements are inclined in opposite orientations relative to the first direction.

16. The lighting device according to claim 10, wherein the light source and the first optical element are disposed along the first direction, and wherein each of the second optical elements in the first array of second optical elements reflects at least a portion of the substantially parallel light incident on the light incident surface in the second direction and transmits another portion in the first direction.

17. The lighting device according to claim 10, further comprising a cover covering a light exit side of each of the second optical elements in the first array of second optical elements, wherein the cover is subjected to an optical treatment to orient the substantially parallel light guided in the second direction below a plane defined by the first direction and the second direction.

18. The lighting device according to claim 10, wherein the light source and the first optical element are configured to transmit the at least a portion of the substantially parallel light to both the first array of second optical elements and the second array of second optical elements.

19. The lighting device according to claim 10, wherein the light incident surface of each of the plurality of second optical elements is inclined relative to the first direction at an angle of 40° to 50°.

20. A display comprising:

a display panel;

a stereo display sheet disposed on the display panel; and the lighting device according to claim 10 disposed above the display panel and along a side of the display panel.

\* \* \* \* \*